Oct. 13, 1970     M. L. WAJDA     3,534,398

CONTROL COUNTER

Filed Dec. 28, 1966     5 Sheets-Sheet 5

$A+B = \overline{C}$

Fig. 5.

$G = \overline{H}$

Fig. 6.

$D \cdot E = \overline{F}$

INVENTOR.
MICHAEL L. WAJDA
BY
Caesar, Rivise,
Bernstein & Cohen
ATTORNEYS.

United States Patent Office 3,534,398
Patented Oct. 13, 1970

3,534,398
CONTROL COUNTER
Michael L. Wajda, Philadelphia, Pa., assignor to Jacobs Machine Corporation, Philadelphia, Pa., a corporation of Pennsylvania
Filed Dec. 28, 1966, Ser. No. 605,425
Int. Cl. H03k *21/36*
U.S. Cl. 235—92          13 Claims

ABSTRACT OF THE DISCLOSURE

A control counter for separating articles into batches of predetermined numbers which includes a counter for counting the articles in each batch. The counter has associated therewith a plurality of groups of switches each of said groups enabling the counter to be preset to recycle at a predetermined count. The control counter further includes a central control for determining the order in which these groups of switches control the recycling of the counter.

---

This invention relates generally to counting systems and more particularly to a counting system adapted to control the number of goods produced in a manufacturing operation and the grouping thereof.

There are many industrial processes where counting arrangements are employed for counting batches of uniform size from a continuous flow of articles. In these systems, each batch is normally uniform and comprises the same number of articles. However, there are many manufacturing applications where a continuous flow of articles are produced which require the grouping of the articles in a large number of different sizes. In the former applications, where the batches are each comprised of a similar number of articles, a preset counter, that is, a counter preset to recycle each time a given count has been reached, can be used very efficiently to control and enable separation of the articles into batches.

These counters, however, are not flexible enough to be used in a manufacturing application such as the latter where each batch is comprised of a different number of articles. Since the process of producing the articles is continuous, the flow of articles cannot be stopped while the counter is reset to a different predetermined count, or if the manufacturing of the articles can be discontinued while the counter is reset, the production must be delayed until the counter is reset. Further, in order to prevent great losses in time in the production cycle, it is necessary to keep an operator posted whose sole function is to watch the counter so that the counter is reset immediately after the completion of a previous batching operation.

One solution to the problem would be to provide a preset counter for each size of batch which is to be produced. These counters would be sequentially initiated upon completion of a previous count. Thus, after the first counter reaches a preset count and thereby indicates the number of articles in a batch is completed the next counter with a preselected different count would be initiated by the next article to be counted. Such a system however while flexible would be very expensive in that a counter would necessarily be provided for each group or batch that is counted. As the number of different groupings increased the number of counters which would be necessary to implement this type of counting control system would increase directly and thus this solution would be financially prohibitive.

It is, therefore, an object of this invention to overcome the aforementioned disadvantages.

Another object of the invention is to provide a new and improved control counter system which is settable to a plurality of limits and which utilizes a single article counter.

Another object of the invention is to provide a new and improved control counter system having a plurality of means for predetermining the recycle count of the counter and which enables the continuous resetting of said preset counts during continuous operation of the counter.

Another object of the invention is to provide a new and improved control counter which is adapted to continuously produce batches of articles of different article sizes.

Still another object of the invention is to provide a new and improved control counter having indicating means to signal the operator after each batch has been completed.

Yet another object of the invention is to provide a new and improved control counter having means for terminating the production of articles after a predetermined number of batches having different numbers of articles in each is completed.

Yet another object of the invention is to provide a new and improved control counter adapted to continuously produce a predetermined number of batches each having a predetermined number of articles per batch.

These and other objects of the invention are achieved by providing in a counting system including a counter for counting electrical impulses, means for setting a counter to recycle at a plurality of predetermined counts, said means comprising a plurality of groups of switches, each group of said switches being settable to a combinatorial code representative of a selected preset recycle count, means for selectively comparing the count of one of said group of switches to the count of said counter, said means for comparing adapted to recycle said counter when said counter reaches the count represented by said combinatorial code of said selected group of switches.

Figure 1:
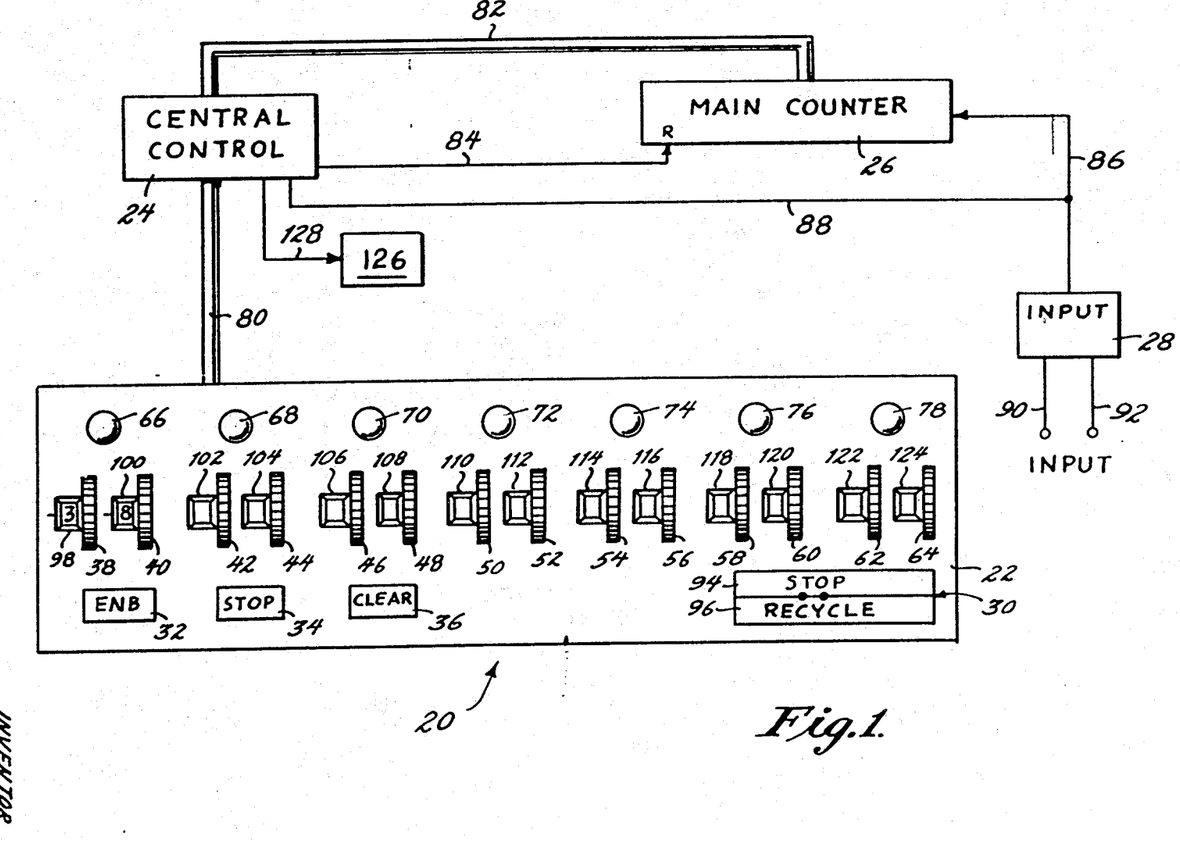
FIG. 1 is a diagrammatic illustration of the control counter embodying the invention.

Other objects and many of the attendant advantages of this invention will be readily appreciated as the same becomes better understood by reference to the following detailed description when considered in connection with the accompanying drawings wherein:

Referring now in greater detail to the various figures of the drawings wherein similar reference characters refer to similar parts, a control counter embodying the present invention in generally shown at 20 in FIG. 1.

The control counter 20 basically comprises a control panel 22, a central control 24, a main counter 26 and an input sensing device 28. The control panel 22 is substantially planar and rectangular and includes a mode switch 30, an enter new bundles (hereinafter referred to as ENB) switch 32, a stop switch 34, a clear switch 36, a plurality of thumb wheels 38 through 64 and a plurality of indicating lamps 66 through 78.

The control panel 22 is connected to the central control 24 via cable 80. Central control 24 is connected to main counter 26 via a cable 82 and a reset line 84. Main counter 26 is connected to the input sensing device 28 via an input line 86. The input sensing device 28 is also connected to the central control 24 via a line 88. The input sensing device 28 is connected to a pair of input lines 90 and 92 which provide control signals to the input sensing device 28 each time an article is produced as will hereinafter be seen.

Mode switch 30 includes a stop portion 94 and a recycle portion 96 which enable operation of the control counter 20 in two basic modes. The thumb wheels 38 through 64 are comprised of groups of two. Therefore, there are seven groups of two thumb wheels. The first group is comprised of thumb wheels 38 and 40, the second group is comprised of thumb wheels 42 and 44, the third group is comprised of thumb wheels 46 and 48, the fourth group is comprised of thumb wheels 50 and 52, the fifth group is comprised of thumb wheels 54 and 56, the sixth group is comprised of thumb wheels 58 and 60 and the seventh group is comprised of thumb wheels 62 and 64. Associated with each group of thumb wheels is one of indicating lamps 66 through 78. The first lamp 66 is associated with the first group of thumb wheels 38 and 40, the second lamp 68 is associated with thumb wheels 42 and 44 and so on to the seventh indicating lamp 78 which is associated with the seventh group of thumb wheels 62 and 64.

Each of the thumb wheels 38 through 64 includes an indicating portion which includes an indicia bearing surface. Thus, as seen with respect to thumb wheel 38, the numeral "3" can be seen through an opening 98 which is provided in control panel 22. Similarly, openings 100 through 124 are provided adjacent to and corresponding to thumb wheels 40 through 64, respectively. Each group of thumb wheels is used to determine the number of articles which is to be produced in a batch. Thus, if thirty-eight (38) articles are desired in a first batch, the first group of thumb wheels 38 and 40 may be turned until the numerals "3" and "8" appear in openings 98 and 100, respectively, as shown in FIG. 1. Similarly, the articles in each batch which are to be produced can be determined by turning the appropriate thumb wheels 42, 44, or 46, 48.

The central control 24 is connected to an output device 126 via output line 128. The output device 126 is used to shift the position at which the articles are placed by the controlled machine after they are manufactured so that batches may be individually formed as separate piles of articles.

Each of the thumb wheels 38 through 46 includes appropriate cam surfaces (not seen) which are combinatorially disposed with respect to each other so that the binary coded equivalent of the numeral within the adjacent opening is generated. For example, thumb wheel 38 generates the binary coded equivalent of the decimal numeral "3" on cable 80.

As will hereinafter be seen, groups of switches are provided for each thumb wheel on control panel 22. Therefore, the cams associated with each of the thumb wheels 38 through 64 combinatorially produce various combinations of closed and opened switches in the groups of switches associated therewith. These combinations are produced in accordance with the indicia which is visible through openings 98 through 124, respectively. The central control 24 includes means for selectively sensing one of said groups of thumb wheels at a time. The switches activated by thumb wheels 38 through 64 are appropriately connected to the wires in cable 80 to the central control 24 so that the particular group of thumb wheels being sensed can be compared to the count supplied via lines 82 of the main counter 26. When the number of articles counted in a batch is equal to the number of articles predetermined for that batch by the corresponding group of thumb wheels, the appropriate lamp is lit corresponding to that group. Thus, if the first group of thumb wheels 38 and 40 is set to "38," and the count in main counter 26 has reached 38, the central control 24 provides a signal to illuminate lamp 66 which is associated with the first group of thumb wheels 38 and 40. This indicates that the first batch is completed. Thus, the central control 24 transmits a signal via line 128 to output device 126 to have the next batch of articles piled in another position.

The central control 24 also provides via line 84 a reset signal to the main counter 26 which enables recycling of the main counter to zero (0) so that the main counter is stepped to a count equal to the number of articles produced in the next batch. Thus, if the switches 30 through 36 are appropriately pressed and lamp 68 is not illuminated, the central control 24 begins to compare the number indicated by thumb wheels 42 and 44 with the preset count of main counter 26. When the count in main counter 26 is stepped to the same number that is indicated by the thumb wheels 42 and 44, central control 24 provides a signal via cable 80 to lamp 68 which thereby illuminates lamp 68. The central control 24 also provides signals via line 128 to the output device 126 to shift the placement of the next batch of articles as well as to the main counter via input line 84 to recycle the main counter to begin counting the next batch of articles sensed by input sensing device 28.

The mode switch 30, as hereinbefore set forth, provides two basic types of operation. A first type of operation called STOP AT 00 is initiated by pressing stop portion 94 of the mode switch 30. A second type of operation called RECYCLE AT 00 is initiated by pressing the recycle portion 96 of the mode switch 30.

In the STOP AT 00 mode of operation, the central control sequentially senses the settings of the groups of thumb wheels and enables the main counter to count articles of batches in accordance with the settings in each of the groups.

The STOP AT 00 mode of operation is terminated by the following two conditions: (1) If each of the seven lamps 66 through 78 should be lit, indicating that seven batches have been produced, or (2) if the setting of 00 has been set into one of the groups of thumb wheels.

In the RECYCLE AT 00 mode of operation, the central control 24 sequentially senses the groups of thumb wheels. In this mode of operation, the sensing of a 00 setting at a group of thumb wheels does not terminate operation but enables the control counter to be recycled and produce the same number of batches having the same number of articles as were produced during the first cycle of operation. That is, if numbers are set into the first three groups of thumb wheels and the fourth group of thumb wheels is set at 00, during the first cycle three batches are produced having the numbers of articles specified in the first three groups of thumb wheels, the 00 is detected and another three batches are produced in accordance with the numbers set into the first three groups. Each time the 00 is sensed, the cycle is repeated until the operation of the control counter is terminated.

The control counter can be terminated by pressing stop button 34 or by pressing the STOP AT 00 portion 94 of the mode switch 30. Thus, when the central control reaches the 00 setting when the stop portion of the mode switch 30 is pressed, the counter is turned off. However, it should be noted that unless the switch 30 or button 34 is pressed in the RECYCLE AT 00 mode of operation, the control counter continues to produce batches in accordance with the numbers specified in the groups of thumb wheels to the left of the group of thumb wheels set at 00.

In one cycle in a STOP AT 00 mode of operation, the maximum number of batches that may be produced without changing settings after operation has started is equal to seven. That is, a batch may be produced by the setting of each of the seven groups of thumb wheels. If seven groups of varying numbers are required, then each group of thumb wheels is set to the predetermined number of articles required in each of the seven batches. To start operation in the STOP AT 00 mode, the ENB switch 32 is pressed which initiates production of the articles and sensing thereof by the input sensing device 28. At the initiation of this mode by pressing of the ENB switch 32, each of the lamps 66 through 78 which is illuminated is turned off.

The central control 24 then senses the number which the first group of thumb wheels 38 and 40 is set to and compares it with the count that the main counter is stepped to by the sensing of the articles produced for the first batch. When the first batch is completed, lamp 66 is illuminated. Similarly, when the second batch, the size of which is determined by the second group of thumb wheels 42 and 44, is completed, lamp 68 is illuminated. This operation is continued until the last or seventh batch of articles is completed in accordance with the number of articles preset by thumb wheels 62 and 64 at which time lamp 78 is illuminated. After each of lamps 66 through 78 is illuminated, the central control senses this condition and thereby terminates operation of the control counter 20 and the article producing machine automatically.

If a lesser number of batches is desired, it is not necessary to set each of the seven groups of thumb wheels 38 and 40 through 62 and 64. If only three batches are desired, the articles required in each of the batches are set in thumb wheels 38 and 40, 42 and 44 and 46 and 48. The fourth group of thumb wheels 50 and 52 are set so that the numerals placed in the openings 110 and 112 are "0" and "0," respectively. Thus, after each of the lamps 66, 68 and 70 is illuminated to indicate that the batches with the number of articles preset by the first groups of thumb wheels is completed, the central control 24 senses the "00" at which the thumb wheels 50 and 52 are set. The central control 24 then terminates operation of both the control counter 20 and the article producing machine.

It should be understood that the invention is not limited to the number of thumb wheel groups shown. It should also be understood that the invention is not limited to the number of thumb wheels shown in each group. The use of two thumb wheels per group is used where the number of articles required in a batch is, of course, always less than or equal to 99. If, however, a third thumb wheel is provided in each group, as many as 999 articles may be specified for each group.

The ENB switch 32 enables the control counter 20 to be extremely flexible in the STOP AT 00 mode. Thus, if more than seven batches of articles is desired and the number of groups of thumb wheels provided on the panel 22 is seven, then the control counter 20 may be operated in the following manner to produce a larger number of batches of articles.

After the first batch has been produced in a STOP AT 00 mode of operation, lamp 66 is illuminated. At this point, the second batch is being completed and the second group of thumb wheels 42 and 44 are being sensed by the central control 24. ENB switch 32 may then be pressed to terminate the illumination of lamp 66. At this point, the first group of thumb wheels 38 and 40 may be adjusted to another setting. Since the lamp 66 was turned off, after the seventh batch has been produced and lamp 78 is illuminated, the central control 24 does not cease operation of the control counter and article producing machine in that not all of the lamps 66 through 78 are illuminated. That is, lamp 66 was turned off by the clear switch 36 being pressed during production of the second batch of articles. Therefore, the new number set into thumb wheels 38 and 40 is then sensed by the central control 24 and an eighth batch of articles is produced.

In this specific example, since lamps 68 through 78 are illuminated, as soon as the eighth batch is completed and lamp 66 is illuminated, the central control 24 senses that all of the lamps are illuminated and terminates the operation. If a larger number of batches is required, it is necessary only to press the ENB switch 32 prior to termination of the operation which is ceased as soon as all of the lamps are illuminated.

It should be understood that when the ENB switch 32 is pressed, all of the lamps illuminated at that time are turned off. Thus, if lamps 68 through 76 are illuminated and the articles of the seventh batch are being counted, pressing ENB switch 32 turns off lamps 68 through 76 (all of the lamps that were illuminated). Thus, if ten batches are desired, the second and third groups of thumb wheels 42, 44 and 46, 48 are set to the number of articles required in the ninth and tenth batches.

When the seventh batch is completed, lamp 78 is lit. Since the remaining lamps have each been turned off, the central control senses the next group of thumb wheels which is the first group. The eighth, ninth and tenth batches are then produced in accordance with the settings of the first, second and third groups of thumb wheels, respectively. Thus, at the end of the tenth batch, lamps 78, 66, 68 and 70 are lit.

Since lamps 72, 74 and 76 are not illuminated, the operation of the control counter is not terminated if the numbers set in the fourth through seventh groups of thumb wheels remain unaltered. To terminate operation after the lamp 70 has been illuminated, it is necessary to change the setting of the fourth group of thumb wheels 50 and 52 to 00 prior to completion of the tenth batch. By doing so, as soon as the 00 in the fourth group is sensed by the control counter 24, the operation thereof is terminated. It can therefore be seen in the STOP AT 00 mode of operation, the control counter continues to produce batches of articles until a condition is reached wherein each of lamps 66 through 78 is illuminated or the central control reaches a 00 setting in any of the seven groups of thumb wheels.

The other basic mode of operation, RECYCLE AT 00, is enabled by pressing the recycle portion 96 of mode switch 30. This mode of operation is used where a number of batches are required, said batches each being comprised of one of a small number of different sizes. That is, if an order requires a similar number of batches of six or less different sizes, the RECYCLE AT 00 mode of operation is suitable. As set forth above, the RECYCLE AT 00 mode enables the sequential batching of articles in accordance with the settings of the groups of thumb wheels. Each time a group of thumb wheels is sensed having 00 set therein, the control counter is recycled so that each of the groups of thumb wheels prior to the group having the 00 is sensed again to enable production of another series of batches having a number of articles as specified by each of the groups of thumb wheels.

For example, where a large number of batches are to be produced of four different sizes, the first group of thumb wheels 38 and 40 are set to the number of articles required in the first size batch, the second group of thumb wheels 42 and 44 are set to the second size, the third group of thumb wheels 46 and 48 are set to the third size, the fourth group of thumb wheels 50 and 52 are set to the fourth size and the fifth group of thumb wheels 54 and 56 are set to 00.

To initiate operation after the recycle portion 96 of switch 30 is pressed, the ENB switch 32 is pressed which thereby starts the control counter and the article producing machine. After the number of articles specified by thumb wheels 38 and 40 are produced by the article counting machine, the control counter provides via central control 24, a signal to the output device 126 which causes the article producing machine to pile the second batch at another position. Also, at the completion of the first group, lamp 66 is illuminated. The second batch of articles is then counted and after the second batch is completed, lamp 68 is illuminated. The output device 126 is again signaled to shift. After the third and fourth batches have been completed, each of the lamps 66, 68, 70 and 78 are illuminated. The central control 24 then senses the output of thumb wheels 54 and 56 which have been set to 00. The sensing of the 00 causes the central control 24 to turn off each of the lamps 66 through 72 and initiate a recycling so that another four batches are produced in accordance with the number of articles specified by the first four groups of thumb wheels.

It can therefore be seen that an endless number of batches having four different sizes can be produced. The operation in the RECYCLE AT 00 mode can be stopped only be pressing stop switch 34. It the stop portion of mode switch 30 is pressed, the mode is changed and the operation is terminated at the sensing of the 00 in the fifth group of thumb wheels. The termination of the operation of the device is immediate, however, upon pressing of the stop switch 34.

In the preferred embodiment shown in FIG. 1, up to six sizes of batches can be produced endlessly in the RECYCLE AT 00 mode. The number of sizes of batches is limited to six by virtue of the fact that only seven groups of thumb wheels are provided. The seventh group must be at 00 for the recycle action to be produced. If an operator should forget to set the thumb wheels 62 and 64 of the seventh group to 00, the control counter enables production of a seventh batch during the first cycle having the number of articles set in the seventh group of thumb wheels. However, upon production of the seventh batch, lamp 78 is illuminated and thus all of the lamps 66 through 78 are lit simultaneously. This condition is sensed by the central control 24 and thereby automatically terminates the operation of the device. Therefore, in the RECYCLE AT 00 mode, a large number of batches of one through six different sizes may be produced.

It can be seen that a new and improved control counter has been provided. The control counter provides an inexpensive and efficient means for utilizing a single counter to control the batching operations of an article producer or dispenser without limiting the size of the batches to any one specific size. The control counter enables an operator to efficiently use his time to produce batches of any size without any delay in the production of the articles. This is so because the opeartor need not shut off the article producing machine while he is resetting the preset to the main counter. Thus, while articles are being produced in a first batch, the operator may set the thumb wheels for the next group of thumb wheels corresponding to the next batch to be produced. The operator can change the setting in every group of thumb wheels other than the thumb wheels which are being sensed at that time.

After the previous batch is produced, the control counter automatically determines the number of articles produced in the next group. In those cases where batches are to be produced with small variation in the sizes, the operator need only set the numbers into the required groups of thumb wheels once and then leave the control counter alone so that it may continue to produce these predetermined sizes automatically.

Figure 2A:
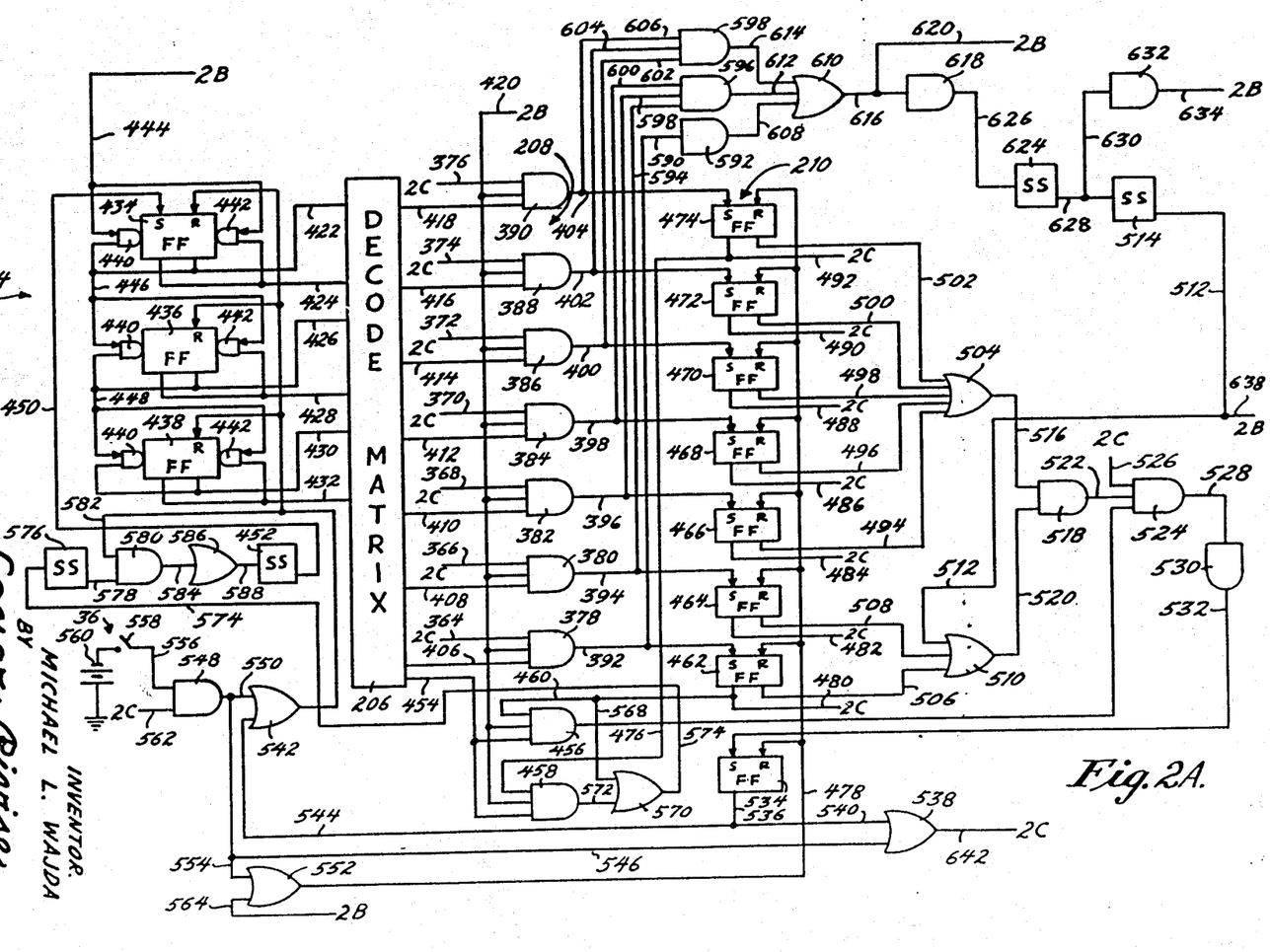
FIG. 2 is a schematic block diagram comprised of FIGS. 2A, 2B and 2C of the control counter embodying the invention.
Figure 2B:
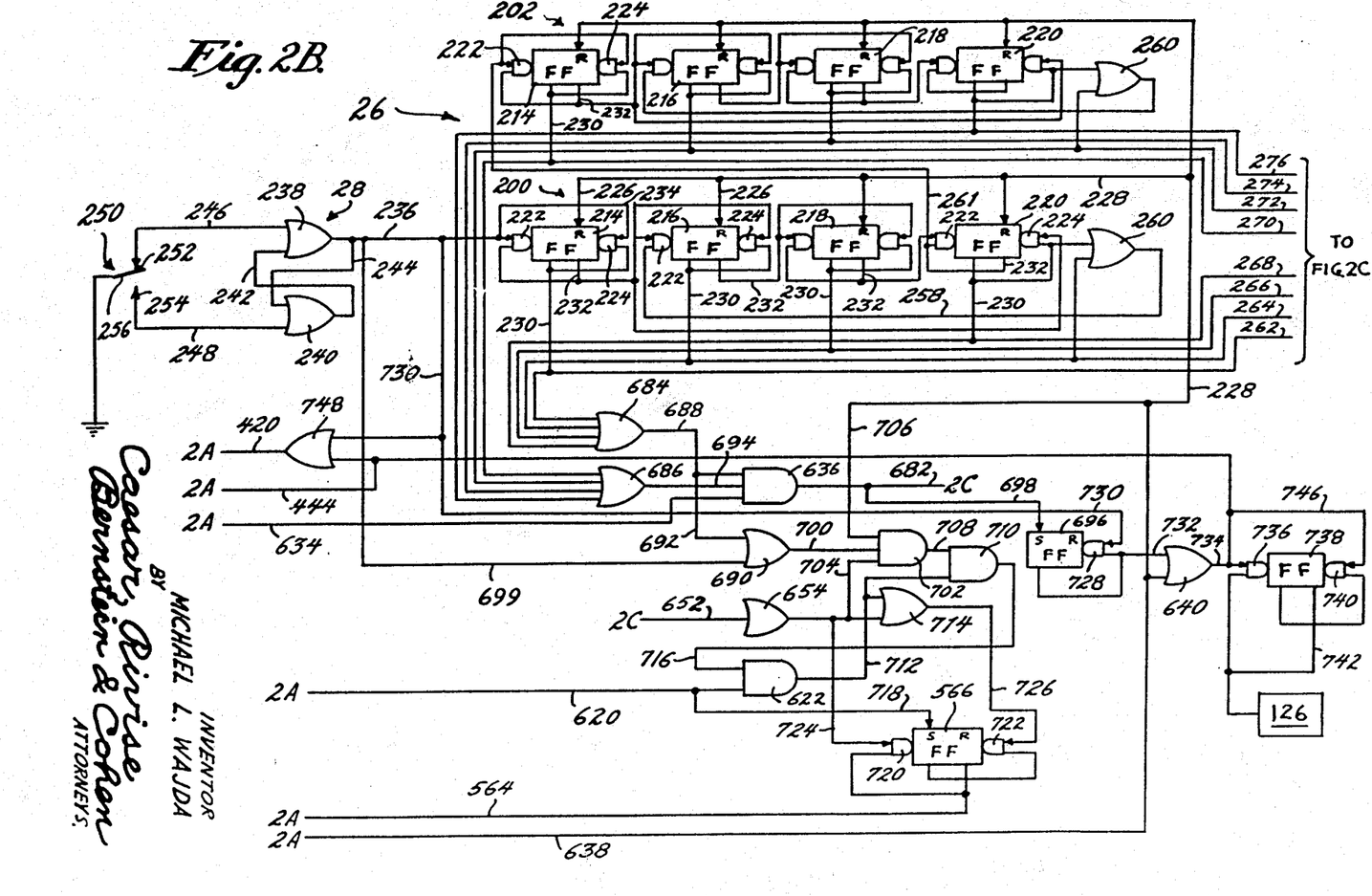
Figure 2C:
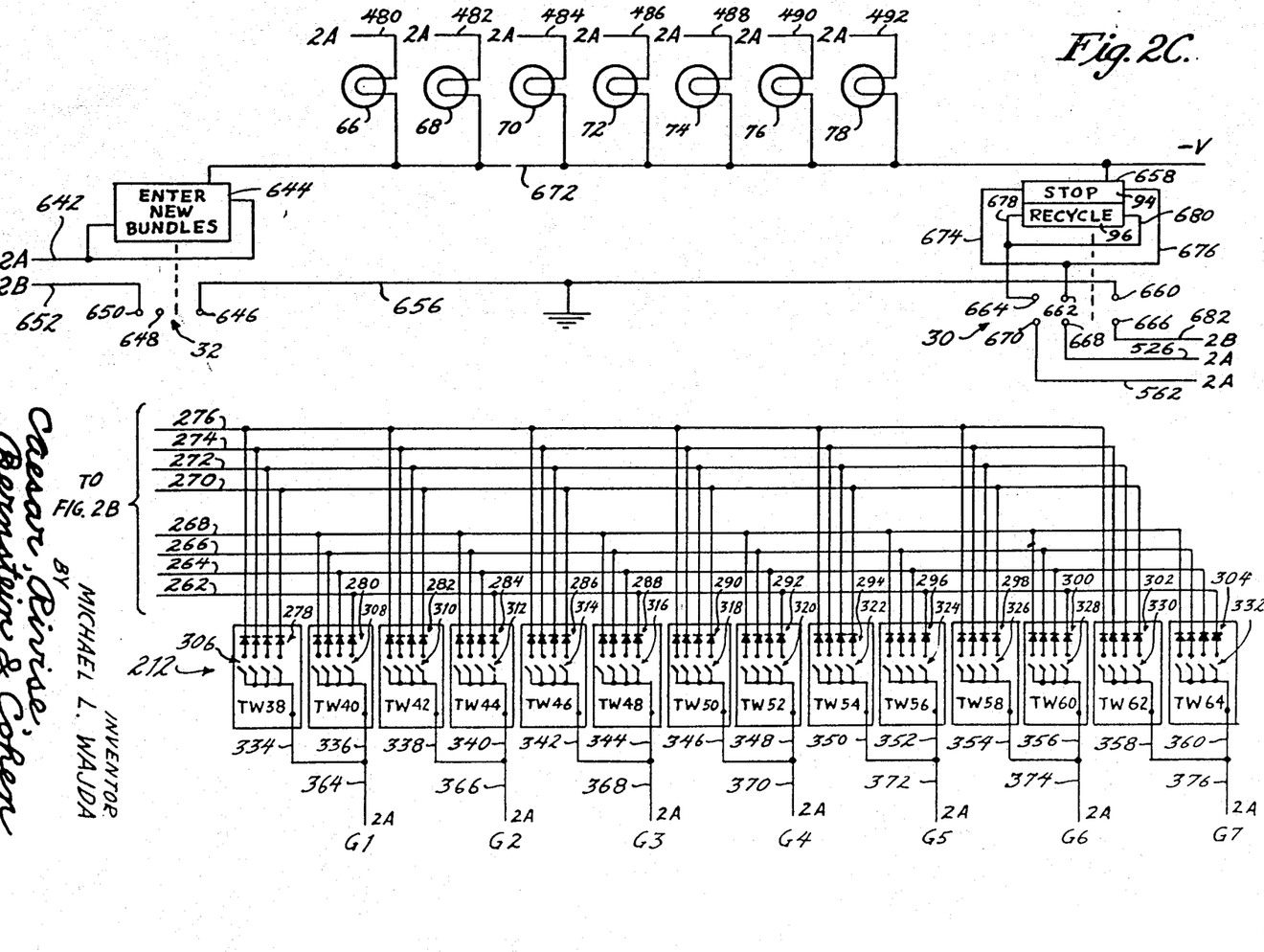

The control counter is shown in detail in FIGS. 2A, 2B and 2C. The circuitry is shown in schematic block diagram form and is preferably comprised of Harmon-Kardon logic modules. The logic modules used throughout the circuit are shown diagrammatically in FIGS. 3 through 8. A first type of flip-flop module used in the circuit of FIG. 2 is shown at 150 in FIG. 3.

Figure 3:
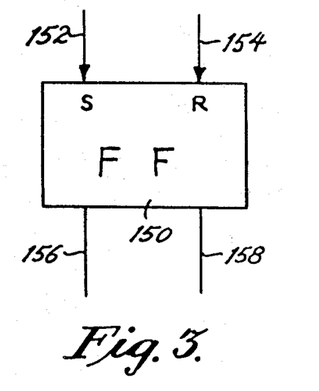
FIGS. 3 to 8 are diagrammatic illustrations of basic gates used throughout the circuitry shown in FIG. 2.

Each flip-flop 150 includes a set input line 152 (adjacent the letter "S"), a reset input line 154 (adjacent the letter "R"), a set output line 156 and a reset output line 158. The operation of the flip-flops 150 throughout the circuitry is as follows: As an incoming signal to set input line 152 drops to a negative potential, the set output line 156 rises to ground potential. At the same time, the reset output line 158 drops to a negative potential. The flip-flop (hereinafter referred to as FF) 150 is thus driven to a "set" condition until a negative signal is applied to reset input line 154. When a negative signal is applied to reset input line 154, reset output line 158 goes from negative to ground and the set output line 156 drops from ground to negative. In this condition, FF 150 is considered to be "reset." As long as the input to input line 152 or 154 remains negative, the corresponding output line 156 or 158, respectively, remains at ground. This is changed by the other input line receiving a negative signal.

Figure 4:
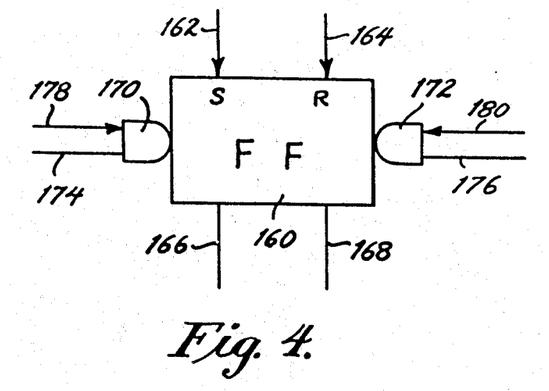

The second type of flip-flop module is shown at 160 in FIG. 4.

FF 160 is similar to FF 150 in that it includes a set input line 162, a reset input line 164, and set and reset output lines 166 and 168, respectively. These lines 162 through 168 are similar to lines 152 through 158, respectively, of FF 150. Application of negative signals to the set and reset lines 162 and 164 operates FF 160 in the same manner that it would operate FF 150.

FF 160 also includes a pair of input gates 170 and 172. The gates 170 and 172 each include a bias input line 174 and 176, respectively, and a trigger input line 178 and 180, respectively. The input lines 174 and 176 when biased to a ground level enable a positive going input signal on either line 178 or 180 to trigger or change the state of the flip-flop. That is, if set output line 166 is at ground and reset output line 168 is negative, a positive going input signal applied to either line 178 or 180 when lines 174 and 176 are at ground potential changes the state of the flip-flop so that the output signal on line 166 is negative and the output signal on line 168 is at ground.

Figure 5:
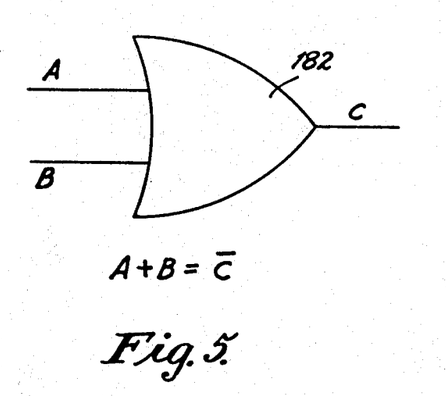

A NOR gate module 182 which is used throughout the circuitry is diagrammatically illustrated in FIG. 5. NOR gate 182 includes input lines labeled "A" and "B" and an output line labeled "C." The operation of NOR gate 182 is as follows:

When A and B are both negative, the output line C is at ground. If either input line A or input line B is at ground potential, the output line C drops to a negative signal. This is represented by the Boolean logic equation shown in FIG. 5, $A+B=\overline{C}$, NOR gate modules 182 actually are provided with a larger number of inputs. Where two or more inputs are used with a NOR gate module, the NOR gate output line is driven negative whenever one or more input lines are at ground. Otherwise, the output on line C is at ground.

Figure 6:
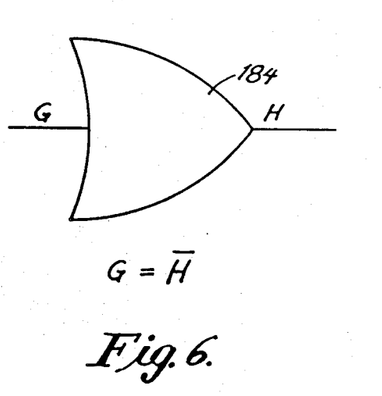

An inverter 184 is shown in FIG. 6 and is comprised of a NOR gate module in which only a single input line is used. The inverter 184 includes an input line G and an output line H. If the input signal to line G is negative, the output signal on line H is ground. Conversely, the input of a ground signal to line G, produces an output signal which is negative on line H.

Figures 7, 8:
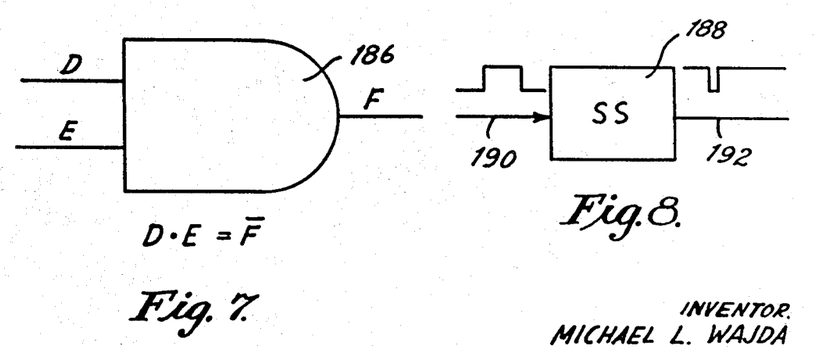

Another type of logic gate module, a NAND gate is shown in FIG. 7. NAND gate 186 includes a pair of input lines D and E and an output line F. The operation of NAND gate 186 is as follows:

When the input signals to lines D and E are both ground, output line F is driven negative. If either the input signal to line D or the input signal to line E becomes negative, the output signal generated on line F becomes ground. This is represented by the Boolean logic equation shown in FIG. 7, $D \cdot E = \overline{F}$. The NAND gate modules actually include a greater number of input lines. Where two or more input lines are used, the output signal generated is ground unless all of the input lines are at a ground potential at which time the output signal is negative. Where only one input line is used, the NAND gate acts like an inverter.

Referring now to FIG. 8, a single shot multivibrator module (hereinafter referred to as SS) is diagrammatically illustrated at 188. SS 188 includes an input line 192. The SS 188 converts a positive going signal on input line 190 into a short duration negative pulse. Thus, each time the signal on line 190 goes from a negative to a ground potential, the SS 188 generates a negative pulse as illustrated by the wave forms adjacent and above lines 190 and 192.

Referring now to FIG. 2 wherein the control counter is shown in detail. FIG. 2 is comprised of FIGS. 2A, 2B and 2C which include the overall schematic diagram of the control counter. Where portions of circuitry shown in a first of these figures are connected to other portions shown in another figure, the lines which are connected therebetween are thus shown discontinued. At the end of each discontinued line in FIGS. 2A through 2C, the legend "2A," "2B" or "2C" is disposed adjacent thereto to indicate the figure number at which the line is continued. That is, where a line connects a gate in FIG. 2A to another gate in FIG. 2C, the line is shown in FIG. 2A with the legend "2C" at the end thereof and in FIG. 2C with the legend "2A" at the end thereof.

The control counter basically comprises a main counter 26 which is comprised of a pair of decade counters 200 and 202 (FIG. 2B), an index counter 204 (FIG. 2A), a decode matrix 206 (FIG. 2A), gating circuitry 208 (FIG. 2A) for determining batch completion, a batch completion memory 210, a comparator 212 (FIG. 2C), lamps 66 through 78 (FIG. 2C) and the associated control circuitry including ENB switch 32 and the mode switch 30 (FIG. 2C) for stopping and recycling operation.

The decade counters 200 and 202 of the main counter 26 are respectively the units and tens article counters. Counters 200 and 202 are substantially similar and each comprise four flip-flops FF 214, FF 216, FF 218 and FF 220. Each of the flip-flops FF 214 through FF 220 is of the type having trigger input gates 222 and 224. FF 214, FF 216, FF 218 and FF 220 of the decade counter each include a reset input 226 which is connected to reset line 228. The bias lines to the input gates 222 and 224 of FF 214 are connected to opposite outputs of FF 214. That is, the set output line 230 is connected to the input gate 224 of FF 214 and the reset output line 232 is connected to the bias input line of gate 222. The input gates 222 and 224 of FF 218 and FF 220 are also similarly connected to the opposite output line. In FF 216, the bias line of input gate 224 is connected to the set output line of the FF 216. However, the remaining bias input line of gate 222 is connected via line 258 to the output of NOR gate 260. The input lines to NOR gate 260 are connected respectively to the set output lines of FF 216 and FF 220. The trigger input line of gate 222 of FF 220 is connected to the reset output line of FF 218. However, unlike FF 214, FF 216 and FF 218, the trigger input line to gate 224 of FF 220 is connected to the reset output line of FF 214 and not the previous stage. As will hereinafter be seen, this connection in combination with the NOR gate 260 connections enables the recycling of the decade counters 200 and 202 after tens input pulses on line 236. The units decade counter 200 is connected to the tens decade counter 202 via line 261 which is connected to the reset output line of FF 220 of counter 200 and the trigger input lines of gates 222 and 224 of FF 214 of counter 202.

The trigger input lines to the input gates 222 and 224 of FF 214 are connected together by line 234. The trigger inputs of FF 216 and FF 218 are also similarly connected in this manner. The trigger input line of gate 222 of FF 214 is connected via input line 236 to input gate 28 which generates pulses, as will hereinafter be seen, each time an article is sensed.

The line 236 is connected to the output of input gate 28 which is comprised of a pair of NOR gates 238 and 240. NOR gates 238 and 240 are cross-connected. That is, output line 242 of NOR gate 240 is connected to one of the inputs of NOR gate 238 and output line 244 of NOR gate 238 is connected to one of the inputs of NOR gate 240. Input lines 246 and 248 of NOR gates 238 and 240, respectively, are connected to the outputs of a photosensitive relay which is schematically illustrated at 250.

The photosensitive relay 250 includes a first terminal 252 which is connected to input line 246 and a second terminal 254 which is connected to input line 248. Relay 250 also includes a movable arm 256 which is connected to ground and which is adapted to be drawn against terminal 254 each time an article is sensed by the photosensitive relay 250. The arm 256 is normally urged against terminal 252 unless an article is passing through the optical portion of the photosensitive relay 250.

The input gate 28 prevents spurious signals from causing extra impulses on line 236 which would cause an error in the count of counter 200. The input gate 28 thus acts as an isolation gate to negate spurious impulses by completely switching from one state to the other after the signal indicative of the presence of an article is terminated. That is, arm 256 is normally urged against terminal 252. Therefore, NOR gate 238 normally generates a negative output in that the ground signal transmitted via arm 256 and terminal 252 to the gate 238 enables the output line 244 to go negative. When an article is sensed by the photosensitive relay 250, arm 256 is drawn against terminal 254 thereby releasing the ground input from terminals 252 and applying it via input line 248 to NOR gate 240.

Output line 242 of NOR gate 240 is thus driven negative and thereby provides a negative input pulse to NOR gate 238. The output signal on line 236 is thereby driven positive. The scond input line 224 to NOR gate 240 also goes to ground thereby further enabling NOR gate 240. As soon as the article is no longer sensed by the photosensitive relay, arm 256 is drawn back to terminal 252. As is well known, when the arm of a relay is drawn back by spring action, there is a tendency for the arm to make contact with the terminal and bounce back for a very short period of time. This is known as chatter and can cause spurious pulses. In order to isolate this chatter from the main counter 26, as soon as the first make is made between terminal 252 and arm 256, the ground input on line 246 to NOR gate 238 causes the output signal on lines 236 and 244 to go negative thereby causing the NOR gate 244 to produce a ground output signal on line 242 since the ground output on line 248 has been terminated by the arm 25 leaving terminal 254. The ground signal on line 242 to NOR gate 238 thus prevents a change in output signal on line 236 if the arm 256 bounces from terminal 252. In this manner, so long as the arm 256 does not make contact again with terminal 254, the gate 28 remains in the same state producing a negative output signal on line 236. Spurious pulses are therefore negated by input gate 28.

Referring back to main counter 26, the units decade counter 200 and tens decade counter 202 are each connected in the following manner: The reset output line 232 of FF 214 is connected to the trigger input lines to gates 222 and 224 of FF 216. Similarly, the reset output line of FF 216 is connected to the trigger input lines of FF 218. The reset output line of FF 218 is connected only to the trigger input line of gate 222 of FF 220.

Each time a positive going signal is produced on line 236, FF 214 is triggered and the state thereof is changed. That is, if the signal on set output line 230 is ground at at time prior to receiving a positive going signal on line 236, the leading edge of the pulse on line 236 drives the set output line 230 negative and the reset output line 232 to ground. Similarly, a positive going signal applied to either the trigger inputs of FF 218 or FF 220 of the decade counters triggers a change of the state thereof. FF 216 normally changes state each time a positive going signal is received at its trigger input lines. The exception is when output line 258 of NOR gate 260 is negative and the set output line of FF 216 is also negative. Thus, since both bias lines to gates 222 and 224 are negative, a positive pulse has no effect on the state of FF 216 in this circumstance.

In each of FF 214, FF 218 and FF 220, one of the input gates 222 or 224 must be enabled at all times. That is, the set and reset output lines 30 and 232 respectively are always opposite in signal from each other. Thus, if output line 230 is at ground, output line 232 must be negative, and vice-versa. Thus, one of input gates 222 or 224 must have a ground signal applied thereto at all times and therefore enabling a triggering of the change of state of the flip-flop each time a positive going signal is applied to trigger input lines of the flip-flop.

NOR gate 260 in decade counters 200 and 202 enables each of the counters to recycle after the count of nine is reached. If FF 216 of counters 200 and 202 were connected similarly to the remaining flip-flops in the counters, the counters would recycle at fifteen in that they would be connected as a binary 4-stage counter. The following example illustrates the operation of the counters 200 and 202:

Assuming a negative signal pulse is supplied via lines 228 to each of FF 214 through FF 220 in decade counters 200 and 202, the count in each of the counters is binary 0000. That is, the output signal on lines 232 of each of the flip-flops is thus at ground. Similarly, each of the output lines 230 from FF 214 through FF 220 are at a negative potential. The flip-flops are therefore each considered to be in the "0" state. When the output signals are reversed by a change in state or triggering of a flip-flop, the flip-flop can be considered as being in the "1" state.

Upon receipt of the first positive input pulse on line 236, the state of FF 214 is changed thereby producing a negative signal on line 232. Since the signal on the output line 232 of FF 214 goes negative (e.g. from ground to negative), the change in signal does not affect FF 216 in that only a positive going signal changes the state of FF 216. Thus, after receipt of the first positive going pulse on line 236, the counter is stepped to the binary count of 0001 which is equal to decimal 1. Upon receipt of the next pulse, FF 214 is again changed in state thereby producing a change in state of the signal on line 232 from negative to ground. The input gate 224 of FF 216 is inhibited by the negative signal from output line 230 of FF 216. However, input gate 222 is enabled by the ground signal produced by NOR gate 260. The positive going pulse on set output line 232 of FF 214 thereby changes the state of FF 216. The set output line of FF 216 thereby goes negative and thus does not change the state of FF 218. The count in decade counter 200 after the second pulse is thus binary 0010 or decimal 2. Upon receipt of the third positive going pulse on input line 236, FF 214 is again changed so that the set output line thereof goes to ground and the remaining flip-flops remain unchanged. The count in counter 200 after three pulses is thus 0011.

After the fourth positive going pulse is received on input line 236, FF 214 is again changed in state. FF 216 is also changed in state thereby causing the reset output line 232 of FF 216 to produce a positive going pulse which triggers a change in state of FF 218. The count after four pulses is thus 0100.

The counts after the fifth, sixth and seventh positive going pulses in the decade counter 200 are, respectively, 0101, 0110 and 0111. Upon receipt of the eighth positive going pulse FF 214, FF 216 and FF 218 are changed from the "1" to the "0" state. The output pulse on reset output line 232 of FF 218 goes positive thereby causing FF 220 to be changed in state from "0" to "1." The count after the eighth pulse is thus 1000. It should be noted that when FF 220 is changed in state, set output line 230 thereof rises to ground. Since output line 230 of FF 220 is connected to the input of NOR gate 260, the output line 258 thereof is driven negative. On the ninth pulse, only FF 214 is affected and changed in state. The count in counter 200 is thus 1001 after the ninth pulse. Upon receipt of the tenth pulse, FF 214 is changed in state from "1" to "0." The input gates 222 and 224 of FF 216 are both biased by negative signals in that the output of NOR gate 260 is negative and the set output line 230 of FF 216 is negative. Thus, FF 216 is not changed in state and remains at 0. Since the set output line 230 of FF 220 is at ground, input gate 224 of FF 220 is enabled and a positive going signal on reset output line 232 of FF 214 changes FF 220 in state from "1" to "0". Thus, after receipt of ten pulses, each flip-flop is in the "0" state and the count in decade counter 200 is 0000.

It will be remembered that reset output line 232 of FF 220 of the unit decade counter 200 is connected via line 261 to the trigger input lines of FF 214 of the tens decade counter 202. Thus, each time the counter 200 is stepped from 1001 (decimal 9) to 0000, a positive going pulse is applied to the trigger input gates of FF 214 of tens decade counter 202 thereby stepping counter 202. Counter 202 operates in the same manner as counter 200 and thus it also returns to a count of 0000 after 1001.

It should be understood that if more than two decades are necessary because batches of more than ninety-nine articles are required, a hundreds decade counter similar to counters 200 and 202 is provided having the trigger input of its first flip-flop connected to the reset output line 232 of FF 220 of the tens decade counter 202.

Output lines 262 through 276 are each connected to one of the set output lines 230 of the respective stages of the units and tens decade counters. Thus, line 262 is connected to set output line 230 of FF 214 of units counter 200, line 264 is connected to the set output line of FF 216 of unit decade counter 200, and so on through line 276 which is connected to the set output line of FF 220 of tens decade counter 202.

Lines 262 to 276 are connected to the comparator 212 shown in FIG. 2C. The comparator 212 comprises a plurality of groups of diodes each associated with one of the thumb wheels 38 through 64 shown in FIG. 1. For purposes of clarity, the diodes and further circuitry associated with thumb wheels 38 through 64 have been grouped within rectangles drawn in full line. Each of the rectangles includes one of the legends "TW 38" through "TW 64" which corresponds to thumb wheels 38 through 64, respectively. Thus, for example, the circuitry within the rectangle having the legend TW 38 is associated with thumb wheel 38. A first group of diodes 278 is associated with thumb wheel 38, a second group of diodes 280 is associated with thumb wheel 40 and similarly, groups 282 through 304 are associated, respectively, with thumb wheels 42 through 64. Each group of diodes 278 through 304 includes four diodes. Each group of thumb wheels is associated with two groups of diodes. Thus, the first group of thumb wheels 38 and 40 are associated with the first two groups of diodes 278 and 280. Similarly, the second group of thumb wheels 42 and 44 are associated with the second group of diodes 282 and 284 and so on through the seventh group of thumb wheels 62 and 64 which are associated with the groups of diodes 302 and 304, respectively. As hereinbefore mentioned, thumb wheels 40, 44, 48, 52, 56, 60 and 64 are the units thumb wheels for each of the first seven groups. Likewise, the thumb wheels 38, 42, 46, 50, 54, 58 and 62 are the tens thumb wheels of the seven groups of thumb wheels.

Therefore, the groups of diodes 280, 284, 288, 292, 296, 300 and 304 associated with the units thumb wheels are connected to lines 262 through 268, respectively. That is, a diode of each of said groups is connected to line 262, another diode of each of said groups is connected to line 264 and the third and fourth diodes of each of these groups are connected to lines 266 and 268, respectively.

Similarly, groups of diodes 278, 282, 286, 290, 294, 298 and 302 associated with the tens thumb wheels are connected in the same manner to lines 270 through 276. The groups of diodes 278 through 304 are connected at their other ends to groups of switches 306 through 332, respectively.

Each group of switches 306 through 332 includes four switches each of which is connected at its first end to one of said diodes in the associated group. The switches each comprise a terminal and a movable arm which is normally separated from said terminal. The arms are urged combinatorially against the switches by the cam surfaces of the thumb wheels. Thus, thumb wheel 38 combinatorially urges the arms of switches 306 against the terminals thereof, the thumb wheel 40 likewise urges the arms of switches 308 against the terminals thereof in combinatorial fashion as does each of the thumb wheels through thumb wheel 64 which urges the arms of switches 332 in combinatorial fashion against the terminals thereof.

Each switch of the group of switches 306 through 332 is connected at its opposite ends to an output line which is connected to the other output line of the group. That is, the arms of each switch in group 306 are connected to output line 334, the arms of switches 308 are each connected to output line 336. Similarly, the arms of each switch in groups 310 through 332 are connected to output lines 338 through 360, respectively. The output lines 334 and 336 are then connected together at output line 364, output lines 338 and 340 are connected to output line 366, lines 342 and 344 are connected to output line 368, lines 346 and 348 are connected to output line 370, lines 350 and 352 are connected to output line 372, lines 354 and 356 are connected to output line 374 and lines 358 and 360 are connected to output line 376. For ease of reference, the legends "G1" through "G7" have been placed adjacent lines 364 to 376, respectively, to indicate that the lines are associated with the first through seventh groups of thumb wheels, respectively.

As will hereinafter be seen, an output signal is provided on lines 364 through 376 each time the number in the main counter 26 is equal to or greater than the number set by the specific group of thumb wheels associated with said output lines.

Output lines 364 through 376 are connected to the gating circuitry 208 (hereinafter referred to as selection gates) in FIG. 2A. The selection gates 208 are comprised of seven NAND gates 378 through 390. NAND gates 378 through 390 enable the control counter to select the group of thumb wheels which should be compared with the main counter 26. They also determine the completion of a specific batch. That is, gates 378 through 390 are connected to the group 1 through group 7 output lines 364 through 376, respectively. The NAND gates 378 through 390 normally generate a ground output signal on their output lines 392 through 404. In order for the outputs of any one of these lines to be driven negative, it is necessary that each of the three inputs thereto simultaneously receive a ground signal. Thus, each of the NAND gates 378 through 390 includes an input line from the decode matrix 206. NAND gates 378 through 390 are connected via lines 406 through 418, respectively, to the decode matrix 206. The third input to each of the NAND gates 378 through 390 is connected to line 420. When all three inputs to any one of NAND gates 378 through 390 are at a ground potential, the NAND gate is enabled and therefore produces a negative signal on its output line. As will hereinafter be seen, only one of the selection gates can be enabled at a time.

The decode matrix 206 includes eight input lines 422 through 432 and eight output lines 406 through 418 and 454. The decode matrix converts the binary input which is applied thereto via input lines 422 through 432 to an output signal on one of its eight output lines 408 through 418 and 454. The decode matrix is preferably a conventional diode matrix which determines the count of the index counter and selects one output line of lines 408 through 418 and 454 in accordance therewith. Thus, if the binary signal on lines 422 through 432 is the equivalent of decimal 1, the diode matrix generates a ground signal on line 406. The remaining lines would all be at a negative potential. Accordingly, if the binary information on lines 422 through 432 is representative of the number 2, the line 408 is at the ground output level. Similarly, a ground output is generated on lines 410, 412, 414, 416 or 418 when the information on lines 422 through 432 is representative of the number 3, 4, 5, 6 or 7, respectively. If the information on lines 422 is representative of zero (0), the line 454 is at ground.

The lines 422 through 432 are connected to the outputs of a binary index counter 204. Index counter 204 comprises three flip-flops FF 434, FF 436 and FF 438, respectively. The operation of binary index counter 204 is somewhat similar to the operation of counters 200 and 202. The counter 204, however, has three stages and is therefore capable of counting only from 0 through 7 at which time it recycles. Each of FF 434 through FF 438 is connected as a binary counter. Thus, the bias lines of input gates 440 and 442 of each of the flip-flops is connceted to the opposite outputs of the individual flip-flop so that a positive going input signal to the trigger input lines of the input gates enables the flip-flop to be triggered and change its state each time. Lines 422, 426 and 430 are each connected to the reset output lines of FF 434 through FF 438, respectively. Lines 424, 428 and 432 are connected to the set output lines of the FF 434 through FF 438, respectively. The information on lines 422 through 432 is thus the present count of the binary index counter 204. The trigger input lines of input gates 440 and 442 of FF 434 are connected to input line 444. The reset output line of FF 434 is connected via line 446 to the trigger input lines of the next stage of the counter FF 436. Similarly, the reset output line of FF 436 is connected to the trigger input line of trigger input gates 440 and 442 of FF 438 via line 448.

The set input line of FF 434 is connected via line 450 to the output of SS 52. Each time a negative pulse is transmitted on line 450, FF 434 is set to the "1" state. Thus, where the index counter 204 has been reset, a negative pulse on line 450 steps the counter of a count of 1. That is, the first stage of the counter FF 234 is changed to the "1" state by application of a negative pulse to the set input line.

Output line 454 of the decode matrix 206 is connected to the inputs of NAND gates 456 and 458. NAND gates 456 and 458 also include inputs which are connected to line 420. The third input line 460 of NAND gate 456 is connected to the set output line of FF 462 which is included in the batch memory 210.

Batch memory 210 includes, in addition to FF 462, FF 464 through FF 474. FF 462 through FF 474 are associated with the seven groups of thumb wheels, respectively. The NAND gate 378, which is the selection gate for the first group, is connected via output line 392 to the set input of FF 462. Similarly, output lines 394 through 404 of NAND gates 380 to 390, respectively, are connected to the respective set inputs of FF 464 through FF 474.

The third input of NAND gate 458 is connected via line 476 to the set output line of FF 474 of the batch memory 210. The reset input lines of FF 462 through FF 474 are each connected to line 478. The set output lines of FF 462 through FF 474 are connected to lamps 66 through 78 (in FIG. 2C) via lines 480 through 492, respectively. The reset output lines of FF 466 through FF 474 are connected via lines 494 through 502 to the five inputs of NOR gate 504. The reset output lines of FF 462 and FF 464 are connected via lines 506 and 508 to two of the inputs of NOR gate 510. The third input to NOR gate 510 is connected via line 512 to the output of SS 514.

The output line of NOR gate 504 is connected via line 516 to a first input of NAND gate 518. The output line of NOR gate 510 is connected via line 520 to the second input of NAND gate 518. The output line of NAND gate 518 is connected via line 522 to a first input of NAND gate 524. The third input to NAND gate 524 is connected via line 526 to the mode switch 30 (FIG. 2C). The output line of NAND gate 524 is connected via line 528 to the input of a single input NAND gate 530 which inverts the signal applied on line 528. The output line of NAND gate 530 is connected to the set input line of FF 534 via line 532. The reset input of FF 534 is connected to line 478. The set output line 536 of FF 534 is connected to the first input of a NOR gate 538 via line 540 and to the first input of a NOR gate 542 via line 544. The second input line of NOR gate 538 is connected via line 546 to the output line of a NAND gate 548. The output line of NAND gate 548 is also connected to the second input line of NOR gate 542 via line 550 and to the first input line of a NOR gate 552 via line 554. The first input line to NAND gate 548 is connected via line 556 and clear switch 36 to a D.C. voltage source 560. The clear switch 36 includes an arm 558 which is normally not urged against the terminal. The arm 558 makes contact with the terminal only when clear switch 36 is pressed. The switch 36 is connected to the negative potential of the voltage source 560. The positive terminal of the voltage source 560 is connected to ground. The second input line to NAND gate 548 is connected via line 562 to the mode switch 30 in FIG. 2C.

The second input line to NOR gate 552 is connected via line 564 to the reset output line of FF 566 in FIG. 2B. The output line of NOR gate 552 is connected to line 478 which is in turn connected to the reset lines of FF 462 through FF 474 and FF 534. The set output line of FF 462, in addition to being connected to an input line of NAND gate 456 via line 460, is also connected via line 568 to a first input line of NOR gate 570. The second input line to NOR gate 570 is connected via line 572 to the output line of NAND gate 458. The output line of NOR gate 570 is connected via line 574 to the input of SS 576. The output of SS 576 is connected via line 578 to a first input of NAND gate 580. The second input line of NAND gate 580 is connected via line 582 to the output of NOR gate 542. The output line of NAND gate 580 is connected via line 584 to a single input NOR gate 586 which is in turn connected via output line 588 to SS 452.

In addition to being connected to set input line of FF 462, the output line of NAND gate 378 of the selection gates is connected via line 392 and line 590 to the single input line of NAND gate 592. The output line of NAND gate 380 is connected via line 394 and line 594 to an input line of three input NAND gate 596 as is the output line of NAND gate 382 via lines 396 and 598 and the output line of NAND gate 384 via lines 398 and 600. The output line of NAND gate 386 is connected to a first input line of the three input NAND gate 598 via lines 400 and 602. The output line of NAND gate 388 is connected via lines 402 and 604 to a second input line of NAND gate 598 and the output line of NAND gate 390 is connected via lines 404 and 606 to the third input line of NAND gate 598.

The output line of NAND gate 592 is connected via line 608 to a first input line of NOR gate 610. The output line of NAND gate 596 is connected to a second input line of NOR gate 610 via line 612 and the output line of NAND gate 598 is connected via line 614 to a third input line of NOR gate 610.

The output line of NOR gate 610 is connected via line 616 to the input line of single input NAND gate 618 and via line 620 to a first input line of NAND gate 622 (FIG. 2B). The output line of NAND gate 618 is connected to the input line of a single shot multivibrator 624 via line 626. The output line of SS 624 is connected via line 628 to input line of SS 514 and via line 630 to the single input line of NAND gate 632. The output line of NAND gate 632 is connected via line 634 to a first input line of NAND gate 636 in FIG. 2B. The output of SS 514 is connected via line 512 and line 638 to a first input line of NOR gate 640 in FIG. 2B.

The output line of NOR gate 538 is connected via line 642 to the ENB switch 32 in FIG. 2C. The ENB switch 32 includes a translucent button 644 which has therein a pair of lamps which are connected in parallel. Both lamps are connected at one end to line 642 and are connected together at their opposite end and to line 672. The lamps in button 644 of ENB switch 32 are lit during the operation of the control counter.

Associated with the button 644 of ENB switch 32 are three terminals 646, 648, and 650. When the button 644 of ENB switch 32 is not pressed, the terminal 646 is connected electrically to terminal 648 which is electrically isolated from the remainder of the circuit. However, when the button of the ENB switch is pressed, terminal 646 is urged into electrical contact with terminal 650. Terminal 650 is connected via line 652 to the single input line of NOR gate 654 in FIG. 2B. Terminal 646 is connected to line 656 which is at ground potential. Line 656 also extends to the mode switch 30.

Mode switch 30 is comprised of a two portion button 658 having a stop portion 94 and a recycle portion 96 and six terminals 660 through 670. The button 658 is so associated with terminals 660 through 670 that when the stop portion of button 658 is pressed, terminals 660 and 666 make electrical contact with terminals 662 and 668, respectively. When the recycle portion of button 658 is pressed, terminals 660 and 666 make electrical contact with terminals 664 and 670, respectively. The button 658 includes two pairs of lamps, one pair in each portion of the button. Thus, when the stop portion of the switch 658 is pressed, the lamps in the stop portion are lit and conversely when the recycle portion of the switch is pressed, the lamps in the recycle portion are lit.

All of the lamps in both the ENB button 644 and the button 658 of mode switch 30 are connected on one side to line 672 which is connected to a negative source of voltage —V. The line 656 at ground potential is connected to the terminal 660 of mode switch 30. Terminal 662 of mode switch 30 is connected via lines 674 and 676 to the other side of each of the lamps in the stop portion 94 of button 658. Terminal 664 is connected via line 678 and 680 to the other sides of the lamps in the recycle portion 96 of button 658. Terminal 666 is connected via line 682 to the output line of NAND gate 636 in FIG. 2B. Terminal 668 is connected to line 526 which is connected to an input line of NAND gate 524 in FIG. 2A. Terminal 670 is connected via line 562 to an input line of NAND gate 548 in FIG. 2A.

Referring now to FIG. 2B, it can be seen that lines 262 through 276 which are connected to the respective outputs of the decade counters 200 and 202 are also connected in the following manner:

Lines 262 through 268 are each connected to an input line of a NOR gate 684. Lines 270 through 276 are each connected to an input line of a NOR gate 686. The output line of NOR gate 684 is connected to a second input line of NAND gate 636 via line 688 and to the first input line of NOR gate 690 via line 692. The output line of NOR gate 686 is connected via line 694 to a third input line of NAND gate 636.

The output line of NAND gate 636 is also connected to the set input line of FF 696 via line 698. The output line of NOR gate 690 is connected via line 700 to a first input line of NAND gate 702. The output line of NOR gate 654 is connected to an input line of NOR gate 714 and via line 704 to a second input of NAND gate 702. The third input line to NAND gate 702 is connected via line 706 to the reset line 228 and line 638 and to the output line of SS 514 in FIG. 2A. The output of NAND gate 702 is connected via line 708 to a first input line of NAND gate 710. The second input line of NAND gate 710 is connected to the output line of NAND gate 622 via line 712. The output line of NAND gate 622 is also connected to a first input line of NOR gate 714 via line 712.

The output line of NAND gate 710 is connected to a second input line of NAND gate 622 via line 716. Line 620 which emanates from the output line of NOR gate 610 in FIG. 2A also is connected to the set input line of FF 566 via line 718.

FF 566 includes input gates 720 and 722 the bias output lines of which are cross-coupled to the reset and set outputs, respectively, of FF 566. The trigger input line to input gate 720 is connected via line 724 to the output line of NOR gate 654. The trigger input line to input gate 722 is connected via line 726 to the output line of NOR gate 714. The reset output line of FF 566 is also connected via line 564 to one input line of NOR gate 552 in FIG. 2A as hereinbefore seen.

FF 696 in FIG. 2B includes an input gate 728. The bias input line of gate 728 is cross-connected to the set output line thereof. The trigger input line to input gate 728 is connected via line 730 and line 236 to the output of input gate 28. The set output line of FF 696 is connected to a second input line of NOR gate 640 via line 732. The output line of NOR gate 640 is connected via line 734 to the trigger input line of input gate 736 of FF 738. FF 738 also includes an input gate 740. Gates 736 and 740 have their bias input lines cross-connected to the reset and set output lines, respectively, of FF 738. The reset output line 742 of FF 738 is connected to an output device 126 which controls the placement of the piles of finished articles which are being counted. The trigger input lines of input gates 736 and 740 are coupled together via line 746.

In addition to being connected to line 734, line 746 is also connected to the input line of NOR gate 748 and to line 444 which extends to the trigger input lines of the first stage, FF 434, of the index counter 204 in FIG. 2A. A second input line to NOR gate 748 is connected via line 730 and line 236 to the output of input gate 28. The output line of NOR gate 748 is connected via line 420 to a third input line of each of the selection NAND gates 378 through 390 and NAND gates 456 and 458.

The operation of the control counter is best understood when seen in conjunction with the following examples:

Assuming that a large number of batches having two distinct sizes, 18 and 37 articles per batch, respectively, are required, the first and second groups of thumb wheels 38, 40 and 42, 44 would be set to 18 and 37, respectively. The third group of thumb wheels 46, 48 would then set at 00. The RECYCLE AT 00 mode of operation is instituted by pressing the recycle portion 96 of button 658 of the mode switch 30.

Since the binary coded decimal equivalent of decimals 18 and 37 are 0001 1000 and 0011 0111, respectively, the groups of switches 306 through 312 associated with thumb wheels 38 through 44, respectively, will be closed in the following combinatorial fashion: Only the switch of the group of switches 306 which leads to line 270 is closed. In the group of switches 308, only the switch leading to line 268 is closed. In group 310, the two switches leading to line 272 and line 270 are closed and the remaining switches are open. In group 312, the three switches leading to lines 266, 264, and 262 are closed and the last switch is open. In group 314 and group 316 which are respectively associated with thumb wheels 46 and 48 and which are set at 00, all of the switches are open in both groups.

It can be seen from this example, therefore, that the switches are closed in accordance with the binary coded decimal equivalent of the number shown in openings 98 through 124, respectively, of the front panel 22 of the control counter.

When recycle portion 96 of button 658 of mode switch 30 is pressed, the terminals 660 and 666 are closed electrically to terminals 664 and 670, respectively, of the mode switch. This action applies ground via line 678 and line 680 to one side of each of the lamps in the recycle portion 96 of button 658 and the other side which is at −V thereby energizes the lamps in the recycle portion 96 of the switch thereby lighting portion 96 of the button. The closing of terminals 666 and 670 together also makes a closed connection between line 682 and line 562 thereby connecting the output line of NAND gate 636 in FIG. 2B to the input of NAND gate 548 in FIG. 2A.

To start the operation of the control counter, the button 644 of ENB switch 32 is pressed. This pressing connects terminal 646 to terminal 650 momentarily thereby connecting line 652 to ground momentarily. Line 652 is connected to the input line of NOR gate 654 in FIG. 2B which converts the ground signal to a negative signal on the output line thereof which is fed to NOR gate 714, NAND gate 702 and to the trigger input line of input gate 720 of FF 566. The output line of NOR gate 654 going negative has no effect either on FF 566 or NAND gate 702. However, the output of NOR gate 714 goes to ground thereby assuring that FF 566 is reset. That is, if FF 566 were previously set, this positive going signal on line 726 triggers a change in state in FF 566. If FF 566 is previously in a reset state, the signal has no effect on the flip-flop because the set output line is negative. Since the control counter was previously off, the FF 566 was set prior to the pressing of the ENB button. Since the pressing of the ENB switch is only momentary, the ground input to line 652 or NOR gate 654 is changed to a negative input. The output of NOR gate 654 thereby goes positive again. As output line 724 from NOR gate 654 goes to ground again, FF 566 is triggered to change the state again. This time the FF 566 is set.

The output line 564 which is connected to the reset output line of FF 566 thus has generated thereon a positive going pulse. The leading edge is generated by pressing the button of the ENB switch which reset FF 566 and the trailing edge thereof is generated by releasing the button which set FF 566. The ground pulse on line 564 is applied to the input of NOR gate 552 in FIG. 2A which thereby generates a negative output pulse on line 478 which resets FF 462 through FF 474 and FF 534. The resetting of FF 534 causes the output line 536 to go negative. The negative pulse applied on line 536 is applied to the input of NOR gate 542 thereby causing the output thereof to go to ground. Line 582 is thus ground and causes the output of NAND gate 580 to be driven negative. The negative output of NAND gate 580 is inverted by NOR gate 586 thereby causing a positive input pulse to SS 452. A leading edge of a positive going pulse causes SS 452 to generate a negative pulse on line 450 which sets the first FF 434 of the index counter 204.

By setting the first FF 434 of index counter 204, in effect, a 1 is placed into the index counter. Since line 582 had previously been negative, each of the stages of index counter 204 were reset and the count therein was 000. Since the count in index counter 204 is 001, the decode matrix 206 converts the inputs from the index counter 204 to a ground output on line 406. The ground output on line 406, however, has no effect on NAND gate 378 in that the remaining inputs to NAND gate 378 are not all at ground. Input line 420 to each of the NAND gates 378 through 390 and 456 and 458 is connected to the output line of NOR gate 748 in FIG. 2B. Line 420 is normally at ground unless an article is presently being sensed by the photosensitive relay 250. Thus, unless an article is being counted, line 420 is at ground. The remaining input line to NAND gate 378, line 406, however, is negative unless the count in the main counter 26 agrees with the number set at the thumb wheels in the first group. That is, when the first group of thumb wheels 38 and 40 are preset to the number that is presently in counter 26, output line 364 goes to ground. Thus, as long as the output signal on line 364 remains negative, the circuitry shown in FIG. 2A remains quiescent.

Initially, counter 26 is reset so that the count therein is at 0. Each time an article passes through the photosensitive relay 250, arm 256 makes contact with terminal 254 thereby driving output line 236 of input gate 28 to ground. The output line 236 stays at ground until the article passes through the photosensitive beam. The positive going input on line 236 triggers FF 214 of unit decade counter 200 of the main counter 26. The output from line 236 is also transmitted via NOR gate 748 as a negative pulse on line 420 which inhibits each of NAND gates 378 to 390, 456 and 458 as long as the article remains within the photosensitive beam. The positive pulse on line 236 is also transmitted via line 730 to the input gate 728 of FF 696 which thereby resets FF 696. FF 696 was set previously at the completion of a previous operation of the control counter. This will be more completely described hereinafter. The line 236 is also connected via line 699 to NOR gate 690 which is also enabled by the sensing of the article.

The set output line of FF 696 is thus negative thereby preventing positive going pulses to the trigger input line from further triggering the state of FF 696. The resetting of FF 696 also enerates a negative input to line 732 of NOR gate 640.

After the article is out of the photosensitive relay, the output line 236 again goes negative which affects only output line 420 of NOR gate 748 which goes to ground again. On each successive pulse on line 236 caused by the counting of an article, the decade counter 200 is stepped to a higher count. The tens counter 202 is stepped once upon sensing each tenth article. Since in the example given the thumb wheels 38 and 40 were set to decimal 18, only the state of the main counter is changed until receipt of the eighteen positive going pulse on line 236.

On the leading edge of the eighteenth pulse going to ground on line 236, the count in counter 26 is stepped to decimal 18. The outputs of the various stages of counter 26 are transmitted via lines 260 through 276 to the groups of diodes 278 and 280. Since the diodes which are associated with closed switches 306 and 308 are forward biased, the lines 334 and 336 go to ground thereby driving line 364 to ground. Line 364 stays at ground as long as the counter 26 stays at the count of 18. Although line 364 has gone to ground, NAND gate 378 is not yet enabled in that the line 420 has a negative inhibiting pulse thereon as long as the article is sensed by the photosensitive relay 250. The duration of the article within the light beam, however, is extremely short and therefore line 420 goes to ground shortly thereafter.

When line 420 goes to ground, NAND gate 378 is enabled in that lines 364 and 406 are also at ground. The negative signal produced on the output line 392 of NAND gate 378 causes FF 462 to be set thereby producing a ground signal on set output line 480 which is transmitted to lamp 66 in FIG. 2C. The lamp 66 is thus lit which indicates that the first batch is completed. The reset output line 506 of FF 462 goes negative but does not cause any change in state of NOR gate 510 in that lines 508 and 512 remain at ground potential.

The negative output signal on line 392 is also fed to single input NAND gate 592 which converts the output thereof to a ground signal on line 608 which enables NOR gate 610. The enabling of NOR gate 610 causes the output line 616 of NOR gate 610 to go negative.

The negative signal on line 616 is transmitted via line 620 to NAND gate 622 and FF 566 in FIG. 2B. The negative signal to the set input line of FF 566 drives FF 566 further into the set state and prevents a momentary pressing on the ENB switch to extinguish lamp 66 that is lit to indicate the end of a batch. That is, an input to line 652 does not affect the state of FF 566 so long as the negative input on line 620 and line 718 are applied to FF 566. NAND gate 622 is not affected in that line 716 is at a negative voltage.

The negative input on line 616 is also inverted by the NAND gate 618 to a ground output on line 626 which causes SS 624 to generate a negative pulse. SS 514 is not affected by the negative going pulse on line 628 initially in that it takes a positive going edge to trigger the single shot multivibrator. The negative going pulse is, however, inverted by NAND gate 632 to a positive going pulse on line 634 which is transmitted to NAND gate 636 in FIG. 2B.

Since the main counter 26 is not at 00, but is still at the count of 18, the output signals generated by NOR gates 684 and 686 are negative. The NAND gate 636 is therefore not enabled. As the pulse on output line 628 returns to the ground state, it triggers SS 514 and thereby produces a negative going pulse on output line 512.

The negative going pulse is transmitted via line 638 to the input of NOR gate 640, reset line 228 of main counter 26 and via line 706 to the input of NAND gate 702. The negative going pulse to NOR gate 640 causes output line 734 to go to ground which thereby triggers and changes the state of FF 738. The change in output on reset output line 742 is transmitted to the output device 126 which changes the position in which the articles are to be stacked in the next batch.

The negative pulse to reset line 228 resets each of the stages of decade and unit counters 202 and 200, respectively, thereby causing the count therein to be returned to 00.

When the output line 734 of NOR gate 640 went to ground, the ground signal was also transmitted via line 734 and line 444 to the trigger inputs of the FF 434 of index counter 204 which thereby increased the count in the counter to 010 or decimal 2. The ground output signal on line 734 was also transmitted to the input of NOR gate 748 causing the output thereof to go negative and thereby inhibit the line 420 and each of the NAND gates 378 to 390 and 456 and 458 connected thereto. This prevents accidental enabling of any of these gates during the transient change in index counter 204.

The negative going pulse on line 512 is also transmitted to NOR gate 510. Since the ground input on line 508 remains on the input to NOR gate 510, the signal on line 520 is not changed by the negative pulse.

The setting of the index counter 204 to the count of 2 causes the decode matrix to translate the output thereof to a positive going signal on line 408 thereby providing the signal necessary to enable NAND gate 380 when the second batch is completed. Line 366 which is connected to the input of NAND gate 380 is, however, negative in that the count in the main counter 26 does not yet equal the number 37 set in thumb wheels 42 and 44.

The circuitry is not significantly changed in state until the output line 236 from input gate 28 produces the thirty-seventh positive going pulse. The thirty-seventh positive pulse drives the main counter 26 to the count of 37. The line 366 associated with diodes 282 and 284 rises to ground as a result of the number in the main counter agreeing with the number preset by the thumb wheels 42 and 44. When line 366 goes to ground, NAND gate 380 is conditioned to be enabled by the next ground pulse on line 420. As the thirty-seventh article passes out of the light beam of photosensitive relay 250, the line 420 goes to ground and NAND gate 380 is enabled thereby, thus setting FF 464. FF 464 provides a negative output on line 508. However, NOR gate 510 remains unchanged in that a ground signal is applied to the gate via line 512. Output line 482 of FF 464 goes to ground and thereby enables the lighting of lamp 68 in FIG. 2C which indicates to the operator that the second batch is completed.

The negative output signal from NAND gate 380 also causes the output line of NAND gate 596 to go to ground potential. NOR gate 610 is enabled thereby and provides a negative output to line 620 and to NAND gate 618. The negative signal on line 620 again drives FF 566 further into the set state to prevent a pressing of the ENB switch 32 from turning the lamp 68 off. The negative signal on line 616 is converted by NAND gate 618 to a ground signal which triggers SS 624 to provide a negative pulse on line 628 which is inverted by NAND gate 632 and provides a ground pulse to NAND gate 636 in FIG. 2B which does not enable the gate because the main counter 26 is still at the count of 37. At the termination of the pulse from SS 624, the trailing edge triggers SS 514 which is fed via line 638 to the input line of NOR gate 640, reset line 228 and to the input of NAND gate 702 in FIG. 2B. The negative pulse to line 228 resets the main counter 26 to a count of 0. NOR gate 640 is disabled thereby providing a ground input which triggers FF 738. The change of state of FF 738 causes the output signal on line 742 to be changed. This signal is fed to the output device 126 which changes the location at which the next batch of articles is to be piled.

The output of NOR gate 640 also is transferred via line 444 to index counter 204 and steps the counter to the binary count of 011 or decimal 3. As long as the output pulse of SS 514 remains negative, the NOR gate 640 generates a ground output to NOR gate 748 which enables NOR gate 748 to generate a negative inhibiting pulse 420 which prevents the enabling of NAND gates 378 to 390. As soon as the output pulse of SS 514 goes to ground again, the line 420 goes again to ground and thereby enables NAND gate 382. A second enabling pulse is provided via line 410 from the decode matrix which has converted the output from the index counter 204 to a ground output on line 410. The group output line 368 is electrically isolated (e.g. not connected to either a ground or negative potential) because the thumb wheels 46 and 48 are set at 00 and therefore all of the switches in the groups 314 and 316 are open. Thus, since both of the other input lines to NAND gate 382 are at ground, the gate is enabled.

The enabling of NAND gate 382 sets FF 466 which thereby lights lamp 70 via output line 484 and also causes the output line of NAND gate 596 to go to ground. NOR gate 610 thereby generates a negative output which is supplied to NAND gate 618 and line 620. Again the negative output signal on line 620 prevents the resetting of FF 516 by pressing ENB 32. The output line of NAND gate 618 goes to ground thereby firing SS 624. The output pulse from SS 624 is fed via NAND gate 632 as a positive pulse on line 634 which is fed to NAND gate 636. Since the counter is at 00, both the output of NOR gates 684 and 686 are at ground and thereby enable NAND gate 636 to produce a negative output on line 682 thereof. The negative output signal also is fed to the set input line of FF 696 which is set thereby.

Line 682 is connected to the mode switch 30 in FIG. 2C which routes the negative signal via terminals 666 and 670 to line 562. The negative signal on line 562 causes the output line of NAND gate 548 to go to ground which thereby causes the output of NOR gate 542 to go negative.

The negative signal is fed to the reset line of index counter 204 thereby resetting each of the stages and providing a disabling pulse to NAND gate 580 which thereby causes the output thereof to go to ground. The ground output is converted to a negative output on line 588 to the SS 452.

The set output line of FF 696 (FIG. 2B) goes to ground thereby providing a ground pulse via line 732 to NOR gate 640. The ground signal on line 732 prevents the negative pulse on line 638 which is generated by SS 514 at the termination of the negative pulse on line 628 to cause the output line 734 or NOR gate 640 to change from negative to ground. This in turn prevents the FF 738 from being triggered and thereby cause a change of signal on reset output line 742 to change the placement of the next batch. That is, since the determination of 00 was not actually the counting of a batch, it is not necessary to again change output device 126.

At the time that the output of NAND gate 548 was pulsed with a negative input signal on line 562, the output line went to ground and was also fed to NOR gate 552. NOR gate 552 as a result thereof was enabled and provided a negative output signal on line 478 which was applied to the reset input lines of FF 462 through FF 474 and FF 534. Since only FF 462, FF 464 and FF 466 were in the set state, these are the only flip-flops that are changed to the reset state and the remaining flip-flops are merely driven further into the reset state. The resetting of FF 462, FF 464 and FF 466 also cause the lamps 66, 68 and 70 to be turned off. The output signal therefore on set output line 536 of FF 534 remains negative. Thus, after the output signal on line 628 of SS 624 returns to ground after the negative pulse, the output signal of NAND gate 636 returns to ground thereby enabling NAND gate 548 which provides a negative output signal on line 550 to NOR gate 542.

NOR gate 542 thereby produces an output of ground on line 582 which enables NAND gate 580. The enabling of NAND gate 580 causes a positive going signal to SS 452 which triggers SS 452 to produce a short duration negative pulse on line 450 which sets FF 434 and thereby sets the count in index counter 204 to the count of 001 or decimal 1.

At this point, the operation of the control counter repeats itself. That is, after 18 articles are counted by the main counter, the output device is signaled to start a second batch, the index counter is stepped up to the count of 2, and the second batch is counted. After 37 articles in the second batch are counted, the output device 126 is again signaled to start another batch, the second lamp 68 is lit and the index counter is stepped to the count of 3, at the count of 3, the 00 set into the third group of thumb wheels is detected and the control counter again recycles so that a batch of 18 and a batch of 37 are produced again whereupon the cycle is repeated.

In the above example, were more than two different sizes of batches required, it would have been necessary only to set the thumb wheels in the third through sixth groups to further additional numbers. That is, assuming six different size batches are required, each of the first six thumb wheel groups are comprised of thumb wheels 38 through 60 is preset to different numbers depending on the size of the batches required. The seventh group of thumb wheels is set to 00. The operation is similar to that in the first example up to and including the end of the counting of the second group of 37 articles. Since the third group of thumb wheels included a number larger than 00, the third batch of articles is counted whereupon the index counter is set to 4 and the articles in the fourth group are placed in a fourth batch until the last article in the batch is counted. The index counter is then set to 5 and the fifth group of articles counted and the fifth batch thereby formed. At the end of the fifth batch, the sixth batch is started as the index counter is stepped to the count of 6. The articles are placed in a sixth batch and the number of articles is counted by main counter 26. At the completion of the sixth batch, the index counter 204 is stepped to 7. The 00 is then detected at the beginning of the seventh cycle whereupon the control counter starts to recycle and thereby continue to control the operation of producing six additional batches of the sizes specified by the setting of the six groups of thumb wheels.

If a small number of groups each having a different number of articles therein is desired, the STOP AT 00 mode may be used in the following manner:

The stop portion 94 of the mode switch 30 is pressed thereby connecting terminals 660 and 666 to terminals 662 and 668, respectively. The stop portion 94 of the button 658 is thereby lit as the ground potential is applied to the first sides of the two lamps therein via lines 674 and 676, respectively. Since the opposite side is at —V potential, the lamps are lit.

Assuming that only two batches of 18 and 37 articles, respectively, are required, the thumb wheels 38 through 48 in groups 1 through 3 are set exactly as they were in the first example given above. That is, the first group of thumb wheels 38 and 40 are set to 18 and the second group of thumb wheels 42 and 44 are set to 37. The third group of thumb wheels 46 and 48 are set to 00. Operation in this mode is initiated by pressing the ENB switch so that terminal 646 contacts 650. The operation of the control counter then proceeds exactly as the operation had proceeded in the first example as the operation had proceeded in the first example of the RECYCLE at 00 mode, up until the thirty-seventh article is counted in the second batch.

When the thirty-seventh article is sensed by the photosensitive relay 250, the positive output on line 236 steps the main counters 26 to 37 which is detected to be equal to the number set in thumb wheels 42 and 44 which thereby causes line 366 to go to ground. NAND gate 380 is therefore enabled at the end of the sensing of the thirty-seventh article and NAND gate 596 is thereby caused to produce a ground signal on line 612 which enables NOR gate 610. The enabling of NOR gate 610 causes SS 624 to generate a negative going pulse which is transmitted as a positive going pulse via line 634 to NAND gate 636, since the counter is stepped to the count of 37 at that time, NAND gate 636 is not yet enabled. At the termination of the negative going pulse on line 628, SS 514 is triggered to produce a short duration pulse on line 512 which is transmitted via line 638 to the NOR gate 640 and to the reset line 228. NOR gate 640 thereupon sends a signal to index counter 204 which steps the count therein to 3, and changes the state of FF 738 which thereby provides a signal to the output device 126 to initiate grouping of the next batch in a separate pile.

The stepping of the index counter 204 to the count of 3 is converted by decode matrix to a ground signal only on line 410. Since the setting of thumb wheels 46 and 48 is at 00, line 368 from the third group of diodes is electrically isolated and since the remaining inputs to NAND gate 382 are ground, the gate 382 is enabled. In addition to setting FF 466 and thereby lighting lamp 70, the negative output from NAND gate 382 also causes output line 612 of NAND gate 596 to go to ground which causes SS 624 to generate a negative pulse. NAND gate 632 inverts it to a positive pulse which is transmitted to NAND gate 636 and thereby enables the gate in that the output line 688 and line 694 from NOR gate 684 and NOR gate 686 are at ground due to the fact that the main counter had just been reset and is still at 00 prior to the next article being counted.

The NAND gate 636 is thus enabled and generates a negative output on line 682 which is routed by mode switch 30 to output line 526. Output line 526 is connected to the input of NAND gate 524 in FIG. 2A and causes the output thereof to go to ground which is inverted by NAND gate 530 and thereby provides a negative signal to the set input line of FF 534. The negative signal thereto sets the FF 534 and causes the signal on output line 536 to go to ground. The ground signal is transmitted via line 544 to NOR gate 542 causing the output thereof to go negative. When line 582 goes negative, the index counter is reset at 000 and the input to SS 452 goes negative. The control counter is thereby set to a quiescent condition. Lamps 66, 68 and 70 are each lit which indicates to the operator of the control counter that the two batches are complete and that the STOP AT 00 operation is completed.

Another example of the way the control counter may be used is the following:

Assuming that a large number of batches are required, each having either a different number of articles or a non-systematically recurring arrangement of number. The operator sets the mode of operation to STOP AT 00 mode by pressing portion 94 of the mode switch 20. It will be remembered that the control counter is stopped not only at the 00 setting, but also when all of lamps 66 through 78 are lit. That is, when each of seven batches have been completed without the resetting of FF 462 through 474, the control counter is automatically stopped. For example, assuming that each of seven batches of articles has been counted and that each of gates 378 through 390 had set its respective flip-flop FF 462 through FF 474 and each of said flip-flops were still in their set condition. Reset output lines 506, 508, 494, 496, 498, 500 and 502 thereof would each be negative and thereby cause the output lines 516 and 520 of NOR gates 504 and 510, respectively, to be at a ground potential when SS 514 is triggered. NAND gate 518 thereby is enabled causing a negative output to be generated on line 522 which causes the output line 528 to go to ground. The ground signal is inverted to a negative signal which is transmitted to the set input line of the FF 534 thereby setting the flip-flop and causing the negative output signal on line 536 to be changed to ground. The ground output signal from line 536 resets the index counter 204 via NOR gate 542. The control counter circuitry thereby remains quiescent until the ENB switch 32 or the clear switch 36 is pressed.

If the clear switch 36 is pressed, arm 558 closes and provides a negative pulse to NAND gate 548 which causes the output thereof to go to ground. The ground input has no effect on NOR gate 542 but the output of NOR gate 552 goes negative thereby resetting FF 462 through FF 474 and FF 534 and thereby turning off each of lamps 66 through 78. The ground output signal from NAND gate 548 also has no effect on NOR gate 538 which was enabled by the setting of FF 534. The ENB lamps therefore remain unlit.

If the ENB button were pressed after each of lamps 66 through 78 are lit, another seven batches with the number of articles specified by groups 1 to 7 of the thumb wheels are produced. Thus, pressing of the ENB button 644 causes FF 566 to be reset, then set which in turn causes the NOR gate 552 to be enabled which in turn resets FF 462 through FF 474 and FF 534. The resetting of FF 534 causes the output line 536 to go negative which in turn causes output line 582 to go to ground. The enabling of NAND gate 580 causes the SS 452 to generate a negative pulse which sets index counter 204 to the count of 1. The decode matrix thereby provides an enabling pulse via line 370 to NAND gate 378. Batches are thereby produced in accordance with the numbers set in the groups of thumb wheels 38 through 64.

In the STOP AT 00 mode, it is not necessary to wait for each of the seven lamps 66 through 78 to be lit before the thumb wheels 38 through 64 can be set to other numbers so that further batches can be varied in the number of articles which the batches will comprise. For example, assuming an operator has a list of the size of batches which are required. The operator uses the stop portion 94 of the mode switch 30 by pressing the same. The number of articles which are required in the first batch is set into the first group of thumb wheels 38 and 40. At this point, the operator has the option of either pressing ENB switch 32 and thereby starting the operation of the control counter or preset the second through seventh groups of thumb wheels to the number of articles required in the second through seventh batches. However, to save time, the most efficient expedient is to press the ENB switch 32 immediately after setting the first group of thumb wheels 38 and 40.

As the control counter is counting the first batch of articles, the second through seventh number of articles may be set in the second through seventh groups of thumb wheels, respectively. Thus, by the time the first batch of articles is completed and lamp 66 lit, the second group of thumb wheels 42 and 44 are preset to the number of articles required in the second batch. The control counter counts the second batch of articles and the second lamp 68 is then lit to indicate the completion of the second batch.

If by this time the operator has completed setting each of the seven groups of thumb wheels while the third batch of articles is being counted, the operator can press the ENB switch 32. When ENB switch 32 is pressed, either of two conditions may occur. These conditions are dependent on whether or not any of the selection gates 378 through 390 is enabled. Thus, in this case, since the third batch is being counted, if NAND gate 382 is enabled, the pressing of ENB switch 32 has no effect on the operation of the control counter in that the negative signal on lines 620 and 718 to the set input line of FF 566 (FIG. 2B) prevents the signal from the ENB switch from affecting the operation of the circuit. That is, resetting of FF 462 through FF 466 is prevented as is turning off the lit lamps 66 through 70. If, however, the NAND gate 382 is not yet enabled, only FF 462 and FF 464 are set and lamps 66 and 68 are lit. The negative signal to the set input line of FF 566 is not present therefore enabling the ground pulse applied by the closing of the ENB switch to line 652 to reset FF 566. As will be remembered, FF 566 is set at the trailing edge of the pulse and the setting of FF 566 enables NOR gate 552 to reset FF 464 through FF 474 and FF 534. Since only FF 462 and FF 464 were set, only lamps 66 and 68 are turned off. Since FF 534 remained in a reset state, the output line 536 remained generating a negative signal and does not trigger SS 452 via NAND gate 580 and NOR gate 586. The index counter 204 also remains at the same count. Thus, the control counter continues counting the third batch of articles and only FF 462 and FF 464 and lamps 66 and 68 are changed. The settings of tumb wheels 38 and 40 and 42 and 44 may then be changed so that the number of articles required in the eighth and ninth batches are set into the first and second group of thumb wheels.

When the third batch of articles is completed, lamp 70 is then lit and the fourth batch of articles is counted. The control counter proceeds through the fourth, fifth and sixth batches in normal fashion. During the counting of the seventh batch, when the last article is counted and the main counter is stepped to the same number that the thumb wheels 62 and 64 are set to causing line 376 to go to ground, NAND gate 390 is enabled when the article is out of the light beam of the relay 250. The enabling of NAND gate 390, of course, sets the FF 474 which thereby provides a ground signal via line 492 to light lamp 78. The reset output line 502 goes negative and the signal is fed to NOR gate 504 causing the output thereof to go to ground in that each of the five reset output lines 494 through 505 of FF 466 through FF 474, respectively, are set. However, NAND gate 518 is not enabled in that FF 462 and FF 464 are both reset and thereby provide ground signals to lines 506 and 508 which thereby cause a negative output signal on line 520 to NAND gate 518. Thus, since all of the lamps are not lit, NAND gate 524 does not terminate the operation of the control counter.

The negative output signal from NAND gate 390 also causes the signal on output line 614 of NAND gate 598 to go to ground which causes a negative output signal on line 616.

As hereinbefore set forth, the output on line 616 enables the signal on line 444 to step the count in index counter 204 which is thereby recycled to the count of 000. That is, index counter 204 had been at the count of 111 (decimal 7). The next pulse to the trigger input of FF 434 causes the counter to go to its next highest count which in this case is 000. The decode matrix 206 converts the output from the index counter 204 to a ground output on line 454. The ground output on line 454 is applied to NAND gates 456 and 458. NAND gate 456 is not enabled in that FF 462 has previously been reset and thereby produces a negative signal on its set output line which is applied via line 460 to the NAND gate 456. NAND gate 458, however, is enabled in that the set output line of FF 474 which is applied to gate 458 via line 476 is at ground due to the setting of FF 474 at the completion of the seventh batch.

Output line 572 of NAND gate 458 thereby goes negative causing the output line of NOR gate 570 to go to ground. The ground signal is transmitted via line 574 to SS 576 which is thereby triggered and causes a negative input pulse to line 578 of NAND gate 580. At the end of the pulse, the output line 584 again goes negative as the output of SS 576 returns to ground. The trailing edge of the pulse on line 584 thereby causes SS 452 to produce a negative pulse on line 450 which causes the index counter 204 to be stepped up to the count of 1. The decode matrix thereby produces a ground output on line 406 in response thereto thereby providing an enabling signal for NAND gate 378 when the eighth batch of articles has been completely counted by the main counter 26.

If the ENB switch 32 is not pressed again, at the end of the ninth batch, NAND gate 380 is enabled which causes FF 464 to be set. The setting of FF 464 in turn causes all of lamps 66 through 78 to be lit. As will be remembered, the lighting of all seven lamps causes the control counter to stop.

The lighting of lamps 66 through 78 means that FF 462 through FF 474 are set. It will be remembered, that the setting of all of these flip-flops causes the output lines of NOR gates 504 and 510 to be at ground when SS 514 is triggered and thus enabled NAND gate 518. The enabling of NAND gate 518 produces a negative signal on line 522 to set FF 534 via NAND gate 524 and NAND gate 530. The setting of FF 534 causes output line 536 thereof to go to ground which causes NOR gate 542 to generate a negative output signal on line 582 which is transmitted to the reset input line of all of the stages of index counter 204. The negative signal to each of the stages causes resetting of the index counter to 0 which thereby causes the control counter to go quiescent. Output line 532 of NAND gate 530 is connected by external circuitry (not shown) which turns off the article producing machine. Control counter 20 remains quiescent until further setting of the thumb wheels and pressing of either ENB switch 32 or clear switch 36.

It should be understood, that had more than nine batches been required at any time prior to the enabling of NAND gate 380 at the completion of the ninth batch and the consequent setting of FF 464, ENB switch 32 can be pressed to turn off all of the lamps that are lit at that time and consequently reset each of the flip-flops associated therewith.

Therefore, assuming that the ENB switch is pressed while counting of the eighth batch, all of the lamps that had been lit are turned off. The third through seventh groups of thumb wheels are set to the number of articles required in the tenth through fourteenth batches, respectively, and the control counter counts the batches through the fourteenth batch. If, however, less than fourteen batches are required, for example, eleven, then the operator performs the following operations: The third and fourth groups of thumb wheels 46, 48 and 50, 52, respectively, are set to the number of articles required in the tenth and eleventh batches, respectively. Since only eleven batches are required, the operation of the control counter is terminated. To stop the control counter after the eleventh batch is completed, the operator sets the thumb wheels 54 and 56 of the fifth group to 00.

Thus, on the counting of the last article in the eleventh batch, the NAND gate 384 is enabled thereby setting FF 468. Since only four of the flip-flops 462 through 474 are set, NOR gates 510 and 504 do not produce the necessary outputs in order to enable NAND gate 518. The NAND gate 524 which stops the operation of the control counter and the article producer can therefore not be changed in state to produce the necessary output. However, the output of the selection NAND gate 384 also causes the output line 612 of NAND gate 596 to go to ground which thereby causes a negative output on line 620 and a ground going output on line 626 which triggers SS 624. The positive going pulse on line 634 does not enable NAND gate 636 in FIG. 2B in that the main counter 26 has a count other than 00. At the termination of the negative going pulse on line 628 of SS 624, the SS 514 is triggered thereby producing a negative pulse on line 638 which resets the main counter 26 and causes via NOR gate 640 and line 444 the stepping of the index counter 204 to the count of 5. The fifth output line 414 of the decode matrix thus goes to ground thereby causing NAND gate 386 to be enabled in that the fifth group of thumb wheels is set to 00 and line 372 is therefore electrically isolated and cannot inhibit the enabling of NAND gate 386. The output of NAND gate 386 causes the NAND gates 598 to produce a ground signal on line 614 which causes line 616 to go negative. SS 624 is thus triggered and line 634 has a positive going pulse thereon which causes NAND gate 636 in FIG. 2B to be enabled due to the ground outputs on lines 688 and 694 of NOR gates 684 and 686 which indicate that the main counter 26 is at 00. A negative signal is thus produced on line 682 which is routed via the mode switch 30 to output line 526 which causes the output line of NAND gate 524 to be changed to ground. The article producing machinery is thus turned off and FF 534 is set. The index counter 204 is reset to 000 and the control counter is again quiescent.

If more than fourteen batches of articles are required, then any time prior to the lighting of all seven lamps, the ENB switch can be pressed and the further numbers of articles required in the fifteenth and succeeding batches are set into the thumb wheel groups during the counting of previous batches.

It can therefore be seen that the control counter 20 has great flexibility yet it is simple to operate and requires no external devices for the operation thereof.

The operator can avail himself of all functions of the control counter by using thumb wheels 38 through 64 and switches 30 through 36. Typewriters, keypunch equipment and other input systems are not required in order to operate the control counter of this invention. However, switches 306 through 332 can be readily adapted to be combinatorially activated by punch cards and other conventional input means.

The index counter in combination with the decode matrix and selection gates enables the operator to set or reset any group of thumb wheels except the group of thumb wheels that is being sensed for completion of a batch while the control counter is in operation. Thus, the continuous production of articles is not in any way impeded while the operator is setting up the numbers in the other groups of thumb wheels to determine the number of articles that are to be produced in succeeding batches.

The batch completion memory comprised of FF 462 through FF 474 and lamps 66 through 78 provides a reliable indication to the operator of the status of the control counting operation. The signals provided by the lamps are further supplemented by the lighting of the button of ENB switch 32 as well as the individual stop and recycle portions of the mode switch. That is, so long as the button of the ENB switch is lit, the operator knows that the control counter is still completing an operation. The portion of the mode switch 30 which is lit indicates to the operator which mode of operation the control counter is in at a quick glance. Thus, visual inspection enables the operator to rapidly determine the status of the operation of the control counter and the number of batches completed.

The logic circuitry of the control counter 20 further includes safe-guards to prevent the operator from accidentally losing track of the batches completed by the control counter. The means for preventing these errors used is FF 566 and the associated logic gates 622, 690, 702, 710 and 714 which prevent accidental turning off of a lamp as the operation of a batch is completed by pressing the ENB button simultaneously therewith. That is, if a batch is completed and a lamp is being lit, if the ENB switch were not inhibited from turning off the lamps, the lamp being lit at the completion of the batch could be turned off simultaneously without the operator noticing that the lamp was about to be turned on. However, this possibility is completely negated by the provision of the aforementioned FF 566 and the circuitry associated therewith.

The comparator used which is comprised of the groups of diodes 278 through 304 provides a very inexpensive form of comparison between the thumb wheel settings and the count in the main counter yet a very efficient form of comparison in that the diodes isolate the settings of the thumb wheels and the switches associated therewith from the lines 262 through 276 which are connected to the output of the main counter and the input of NOR gates 684 and 686.

Counting error is further minimized in the control counter by the provision of input gate 28 which is comprised of the pair of cross-coupled NOR gates 238 and 240. The input gate assures the prevention of spurious pulses due to relay chatter. The output of input gate 28 is always a discrete signal due to the bistable nature of the NOR gates 238 and 240. Thus, spurious positive going pulses cannot increase the count in the main counter 26 unless an article is actually being sensed in the photosensitive relay 250.

The STOP AT 00 mode of operation enables the operator to have great freedom during the selection of the number of articles required in succeeding batches while overlooking the batching operations of the control counter. The operator can easily change the settings in the thumb wheels in accordance with the sizes required in succeeding batches. Since the thumb wheels are simple to operate, the operator can easily set succeeding groups of thumb wheels to the next six numbers of articles required in the next six batches while a single batch is being counted. The operator thus has free time for performing other functions. Should the operator forget to reset the succeeding groups of thumb wheels prior to the completion of the seven batches, the control counter automatically turns itself off so that succeeding groups of batches having the wrong number of articles are not produced.

Where the RECYCLE AT 00 mode of operation can be used, the operator has complete freedom after the initial settings are made into the appropriate groups of thumb wheels. After the ENB button is pressed, the control counter continues to produce batches without further setting or manipulation of the thumb wheels. Thus, an endless number of batches can be produced until the control counter is turned off.

Without further elaboration, the foregoing will so fully illustrate my invention that others may, by applying current or future knowledge, readily adapt the same for use under various conditions of service.

What is claimed as the invention is:

1. An article counting system comprising means for sensing article and producing electrical impulses in response thereto, a counter for counting said electrical impulses, a plurality of manually settable members, said members being sub-divided into groups of similar numbers, each of said groups of members adapted to provide a combinatorially coded signal representative of a selected number, means for sequentially comparing the count of said counter with the combinatorial code of succeeding ones of said groups of numbers and means responsive to said means for resetting said counter each time said count in said counter is equal to said number represented by said combinatorial code in the selected one of said groups, a storage means, said storage means comprised of a plurality of bistable elements having a first and second stable state, said bistable elements normally being in said first state and each being associated with one of said groups of members, said bistable elements adapted to change to said second state when the count in said counter is equal to the number in the associated group of said members and said group is simultaneously selected for comparison so that a temporary record of the completion of the count in said counter in accordance with the settings of said numbers set in said group of members is established.

2. The article counting system of claim 1 wherein said means for sequentially comparing includes means responsive to a unique number in said selected group of members for terminating operation of said counter.

3. The article counting system of claim 1 wherein said system includes means for causing said means for sequentially comparing to sequentially select the groups of members in a preselected order until a group of said members are sensed having a unique setting whereupon said means repeats the selection order of said group of members, said operation continuing iteratively.

4. The article counting system of claim 1 wherein said members each comprise a rotatable thumb wheel whereby said numbers may be set by rotation thereof.

5. The article counting system of claim 1 wherein said combinatorial code is established by groups of switches, said switches being combinatorially opened and closed in accordance with the setting of said thumb wheels.

6. The article counting system of claim 1 wherein said members are electrically isolated from said counter so that all but said selected group of members may be manually set to different numbers during the operation of the system.

7. The article counting system of claim 1 wherein said means for sequentially comparing includes an index counter and a decode matrix, said decode matrix having a plurality of output lines, said decode matrix being associated with the output of said counter so that an output signal is provided on sequential ones of said output lines of said decode matrix in accordance with the stepping of the count in said index counter, said means for sequentially comparing further including a plurality of selection gates, each of said selection gates being associated with one of said output lines of said decode matrix and one of said groups of members, said selection gates adapted to signal said means for resetting said first named counter each time said selection gate is enabled by an equal count in said first named counter and the number in said group of members and by said output line of said decode matrix.

8. The article counting system of claim 7 wherein the maximum number that said index counter is adapted to count is equal to the number of said groups of members, said index counter being recycled after the number in the last group of said members to be selected has been counted in said first named counter.

9. The article counting system of claim 1 wherein said system further includes means for terminating the counting operation of said counter when either all of said bistable elements are changed to said second state or when a selected group of said members is set to a unique number.

10. The article counting system of claim 9 wherein means are provided for changing all of said bistable elements in said second state to said first state while said system is in operation so that the number of articles for succeeding batches may be set into said group of members associated with said bistable elements changed to said first state.

11. The article counting system of claim 1 wherein said system further includes a plurality of lamps, each of said lamps associated with one of said bistable elements, said lamps adapted to be lit each time said bistable element is in said second state.

12. The article counting system of claim 11 wherein said system further includes a switching means, said switching means adapted to initiate operation of said counting system and change each of the bistable elements in said second state to said first state.

13. The article counting system of claim 12 wherein said switching means includes an illuminable button for signaling the operator that the counting system is in operation.

References Cited

UNITED STATES PATENTS

| | | | |
|---|---|---|---|
| 2,669,388 | 2/1954 | Fox | 235—92 |
| 3,074,632 | 1/1963 | Braun et al. | 235—132 |
| 3,291,910 | 12/1966 | Nicklaus et al. | 340—146.2 |
| 3,359,406 | 12/1967 | Perry | 235—92 |
| 3,383,525 | 5/1968 | Arksey | 328—48 |
| 3,391,305 | 7/1968 | Bradwin | 235—132 X |

OTHER REFERENCES

"Predetermined Counters," Electronics, March 1947.
Brierley: "An Industrial Batching Counter," Electronic Engineering, April 1954.

MAYNARD R. WILBUR, Primary Examiner

G. R. EDWARDS, Assistant Examiner

U.S. Cl. X.R.

328—48; 340—146.2